United States Patent
Kobayashi et al.

(10) Patent No.: US 9,472,145 B2
(45) Date of Patent: Oct. 18, 2016

(54) LIQUID CRYSTAL DISPLAY DEVICE INCLUDING AN OPENING IN A COLOR FILTER

(71) Applicant: Panasonic Liquid Crystal Display Co., Ltd., Hyogo (JP)

(72) Inventors: Takahiro Kobayashi, Okayama (JP); Yoshio Umeda, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/826,164

(22) Filed: Aug. 13, 2015

(65) Prior Publication Data

US 2015/0348478 A1     Dec. 3, 2015

Related U.S. Application Data

(63) Continuation of application No. 13/730,115, filed on Dec. 28, 2012, now Pat. No. 9,142,170.

(30) Foreign Application Priority Data

Dec. 28, 2011   (JP) ................ 2011-289605

(51) Int. Cl.
*G02F 1/1335*   (2006.01)
*G09G 3/36*     (2006.01)
*G06T 5/20*     (2006.01)

(52) U.S. Cl.
CPC .......... *G09G 3/3607* (2013.01); *G06T 5/20* (2013.01); *G09G 3/3648* (2013.01); *G09G 3/36* (2013.01); *G09G 2320/0238* (2013.01); *G09G 2320/0646* (2013.01); *G09G 2320/0666* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 2006/0268203 A1* | 11/2006 | Kurahashi | G02F 1/1347 349/108 |
| 2011/0109851 A1 | 5/2011 | Ono et al. | |
| 2011/0304806 A1 | 12/2011 | Higa | |
| 2012/0148946 A1* | 6/2012 | Tu | G02B 5/201 430/7 |
| 2012/0169792 A1 | 7/2012 | Yamashita et al. | |

FOREIGN PATENT DOCUMENTS

| | | |
|---|---|---|
| JP | 11-295717 A | 10/1999 |
| JP | 2011-100025 A | 5/2011 |
| WO | 2011040021 A1 | 4/2011 |

* cited by examiner

*Primary Examiner* — Liliana Cerullo
*Assistant Examiner* — Donna Lui
(74) *Attorney, Agent, or Firm* — McDermott Will & Emery LLP

(57) ABSTRACT

The present application discloses a liquid crystal display device for displaying a video on a display surface with pixels arranged in a matrix. Each of the pixels has three sub-pixels formed with different color filter portions in hue. The display surface includes pixel sets. Each of the pixel sets is defined to include two or three of the pixels next to each other in at least one of the vertical and horizontal directions. An opening is formed on one of the color filter portions every hue in each of the pixel sets.

5 Claims, 33 Drawing Sheets

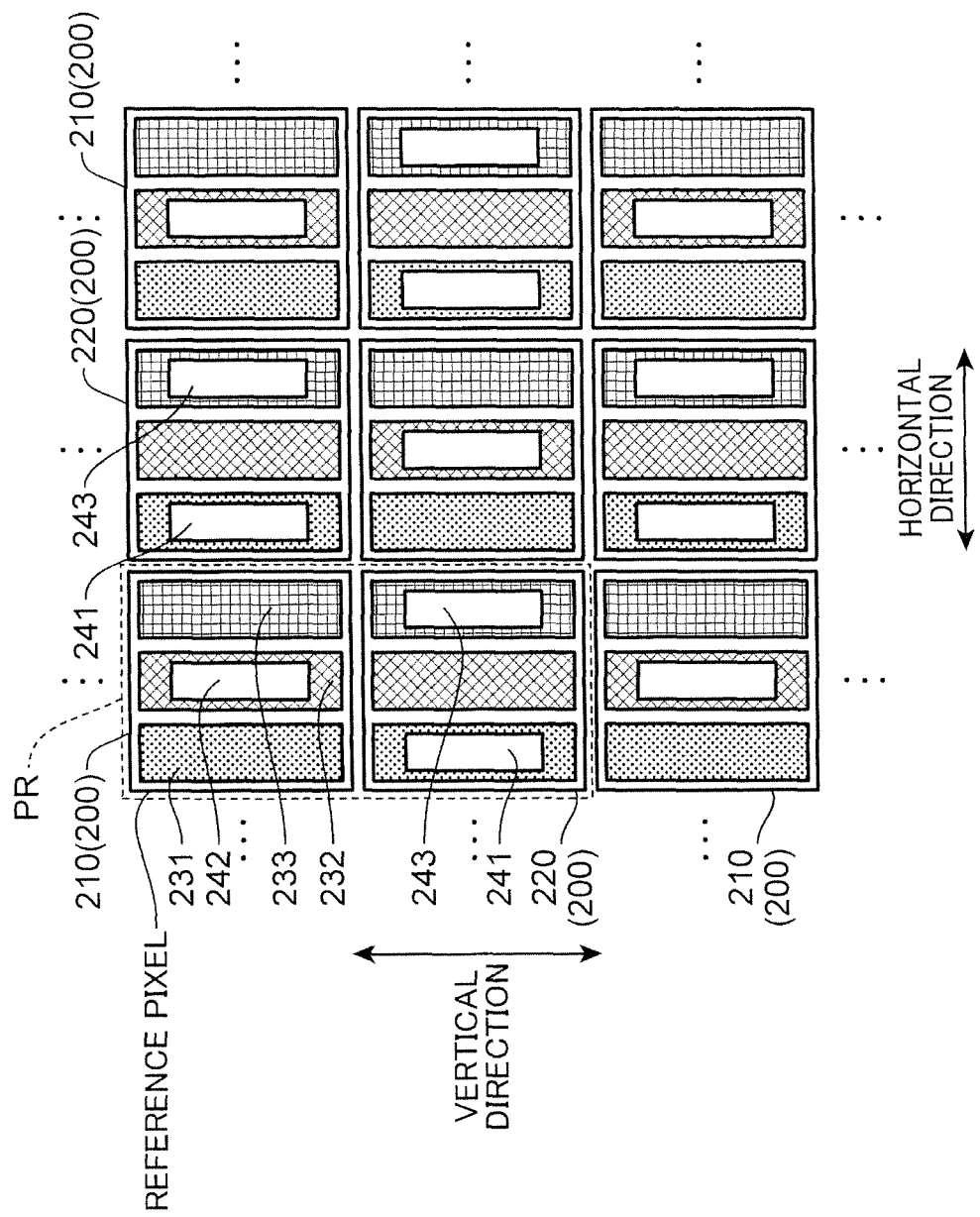

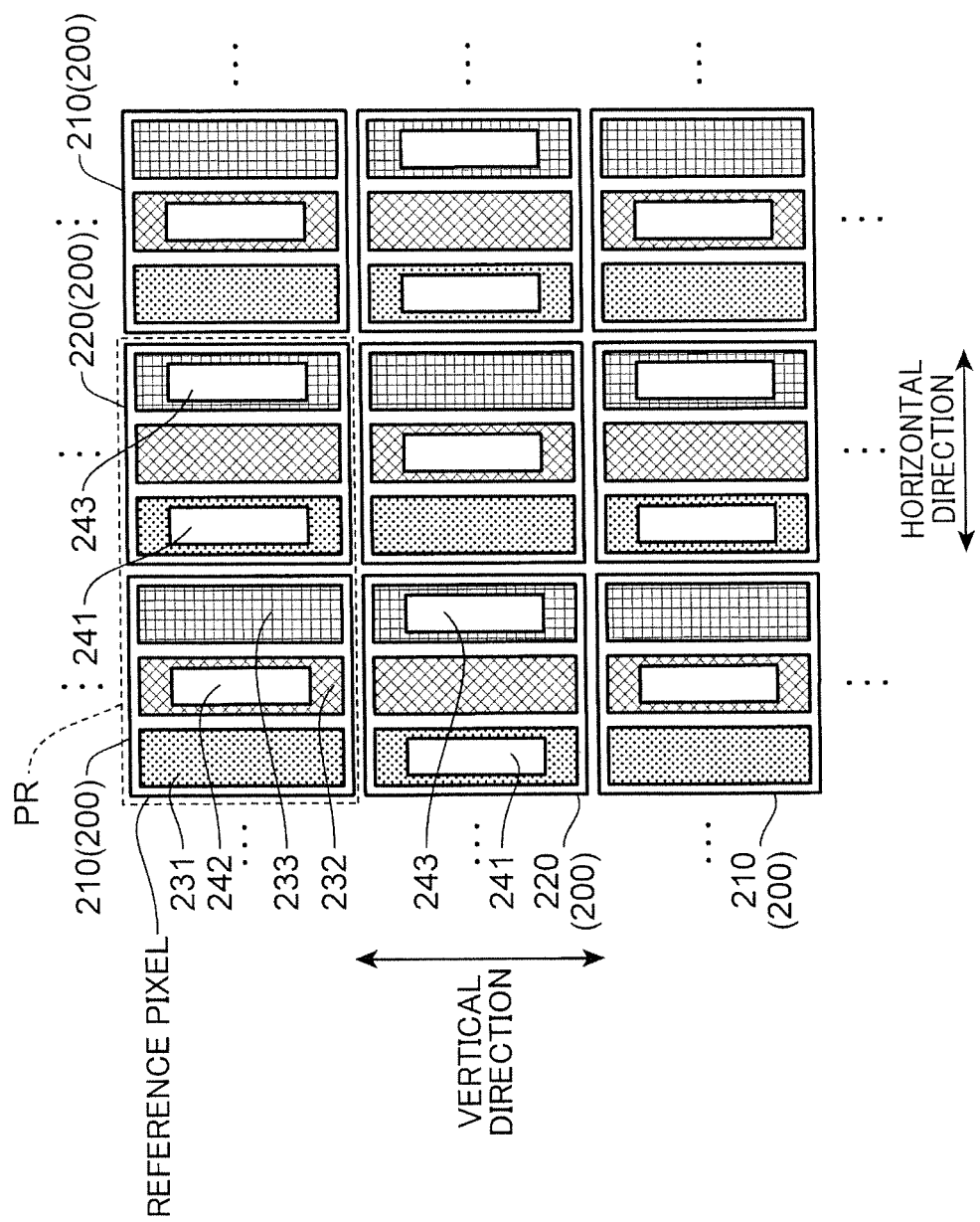

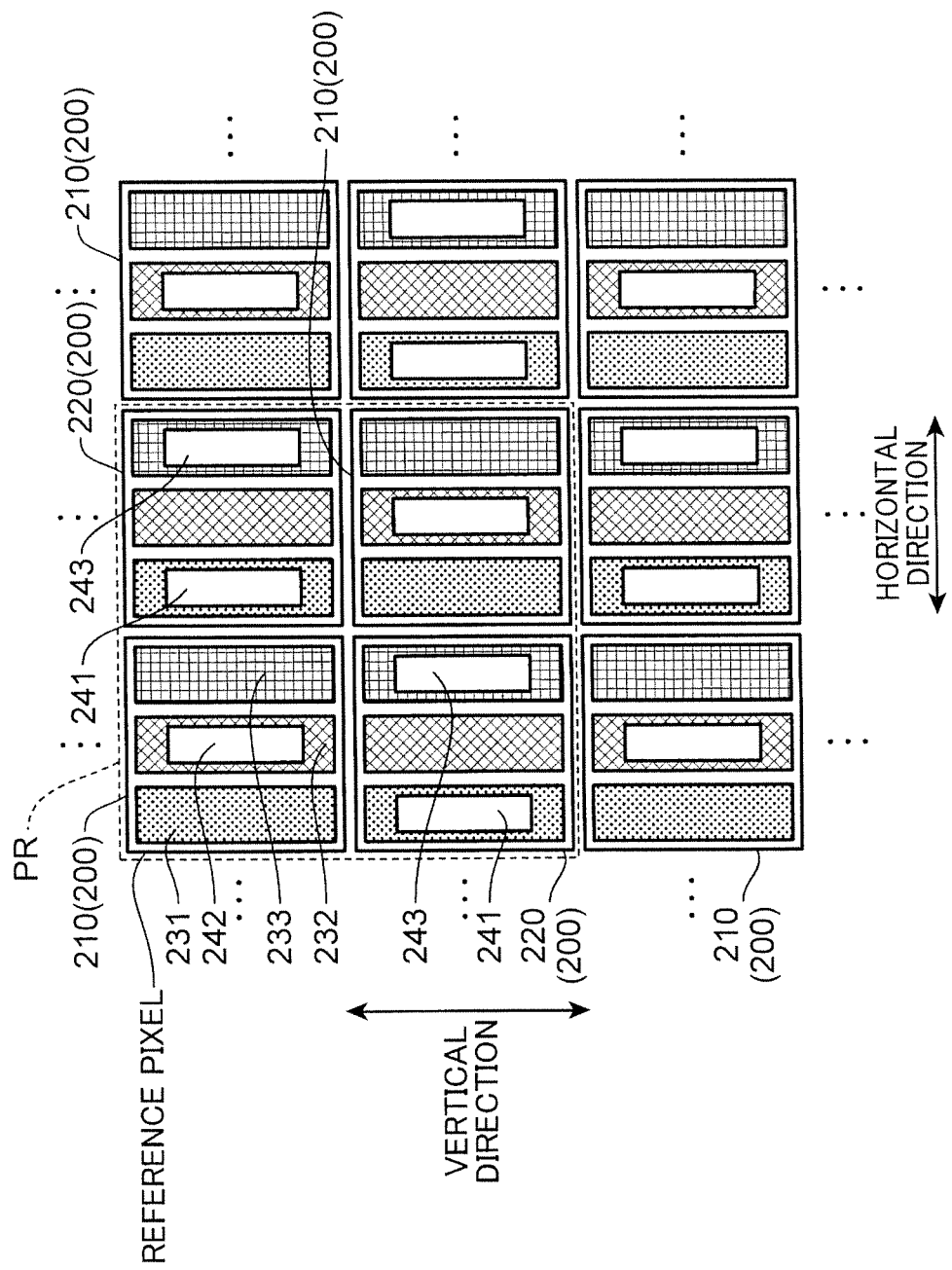

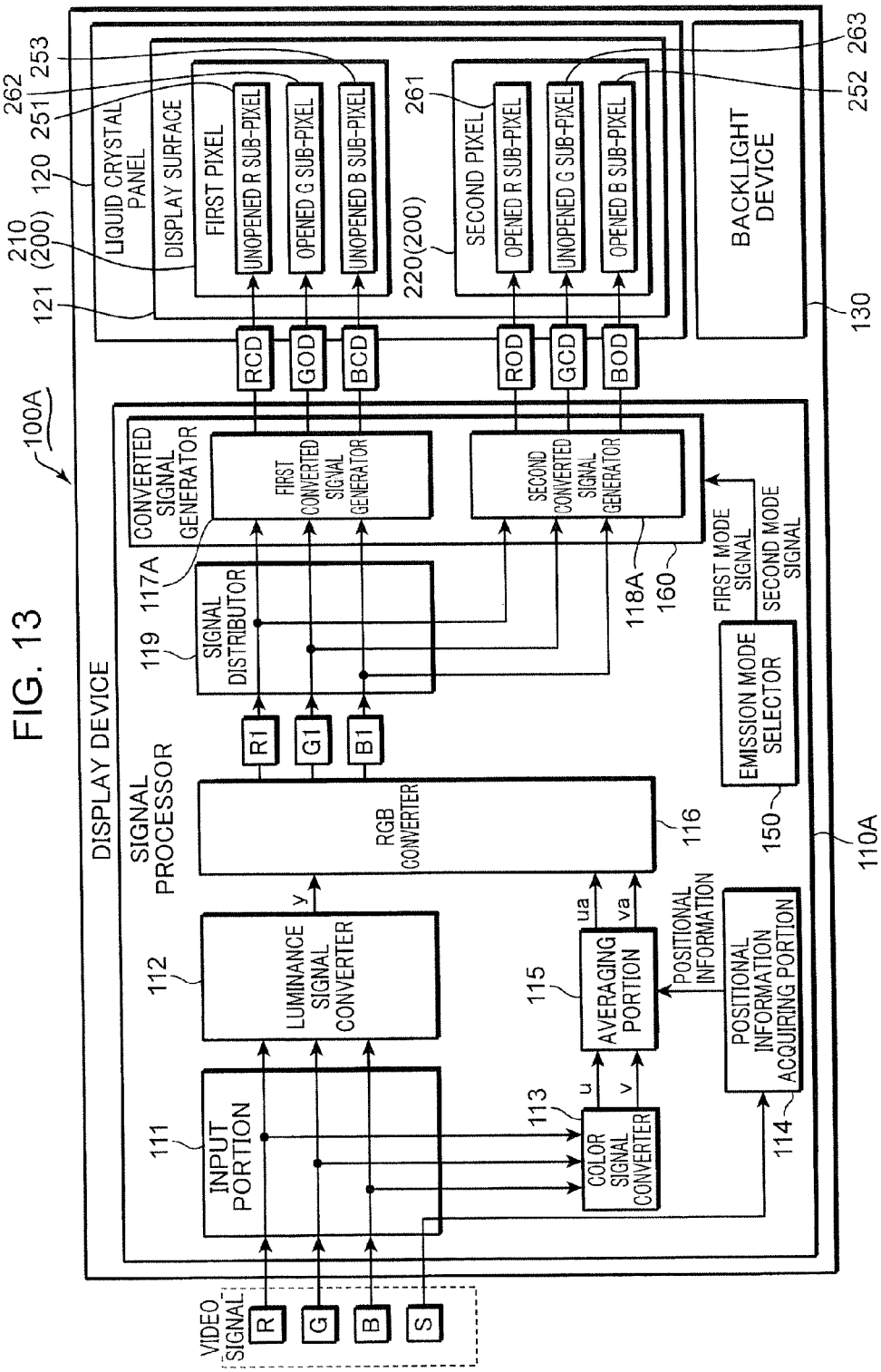

FIRST EMISSION MODE

SECOND EMISSION MODE

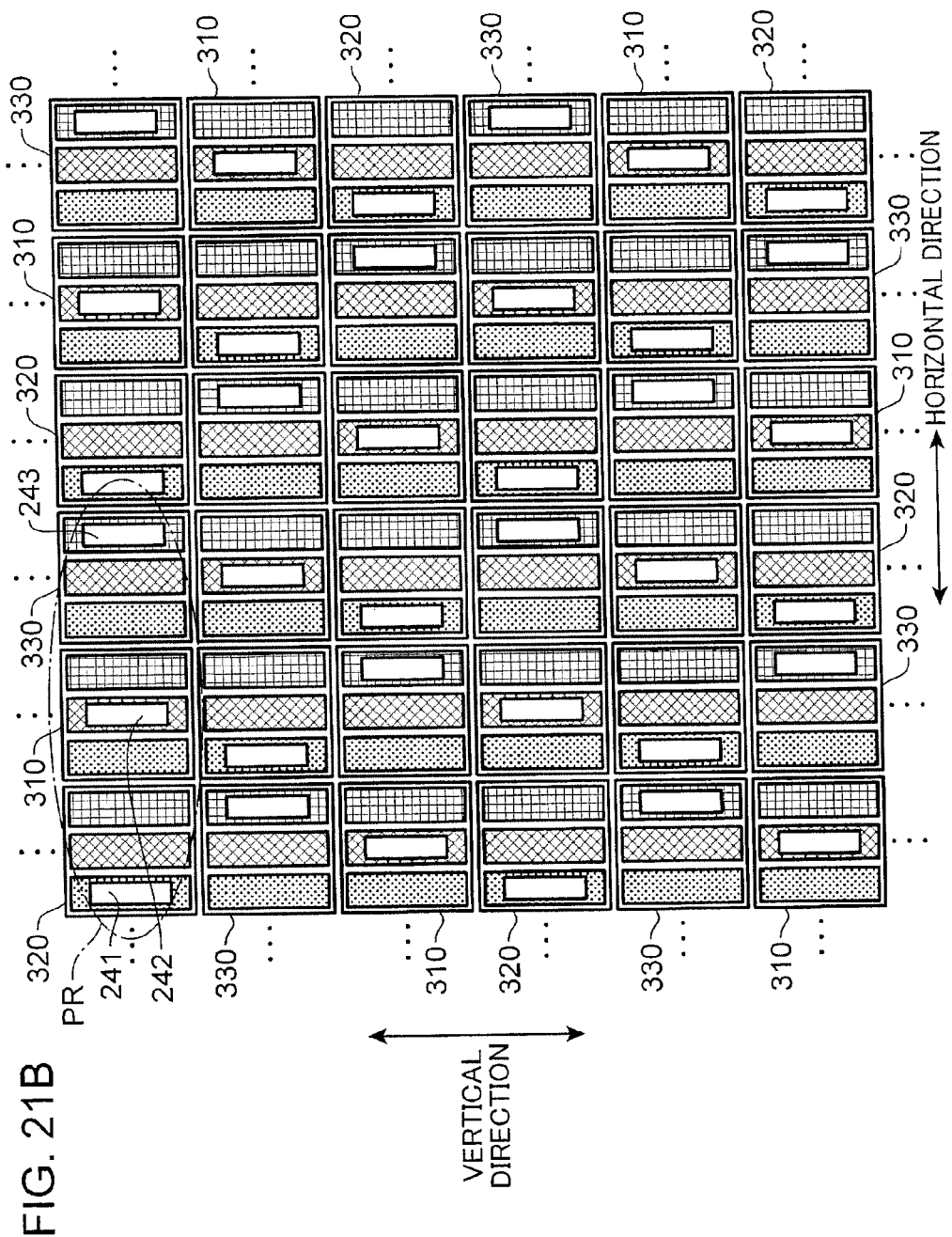

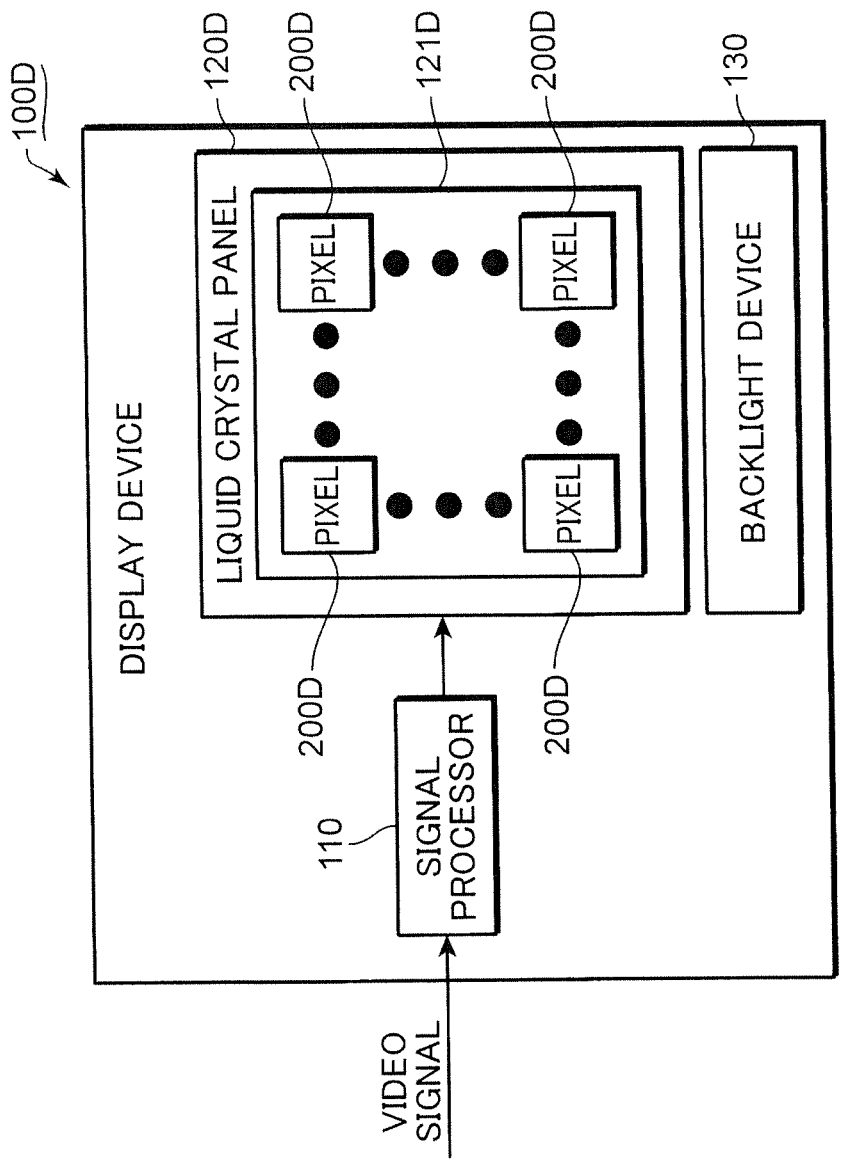

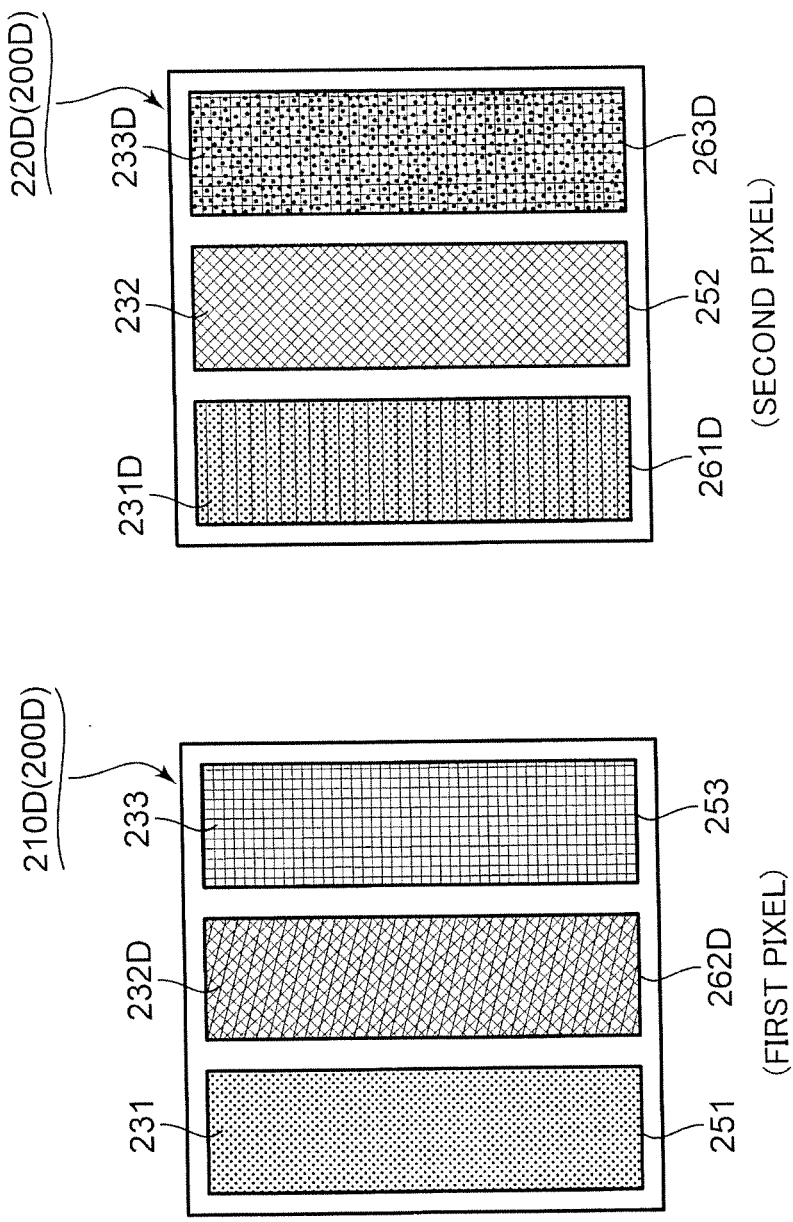

LIQUID CRYSTAL DISPLAY DEVICE INCLUDING AN OPENING IN A COLOR FILTER

RELATED APPLICATIONS

This application is a continuation of U.S. patent application Ser. No. 13/730,115, filed on Dec. 28, 2012 which in turn claims the benefit of Japanese Patent Application No. 2011-289605 filed on Dec. 28, 2011, the disclosures of which applications are incorporated by reference herein.

BACKGROUND

1. Technical Field

This disclosure relates to a display device for displaying a video by means of liquid crystal.

2. Description of the Related Art

Techniques for displaying a video by driving liquid crystal have been widely applied to display devices. A liquid crystal display device generally includes a display surface formed of pixels and a backlight device for emitting light toward the display surface. Typically, each of the pixels includes a red sub-pixel with a color filter corresponding to a red hue, a green sub-pixel with a color filter corresponding to a green hue, and a blue sub-pixel with a color filter corresponding to a blue hue. Light from the backlight device passes through these color filters and is emitted as a red light, a green light and a blue light from the display surface. Consequently, a video is displayed on the display surface.

Japanese Patent Publication H11-295717 A discloses techniques for enhancing luminance of a video. According to Japanese Patent Publication H11-295717 A, the display surface is formed with pixels, each of which has a sub-pixel provided with a transparent layer in addition to the aforementioned sub-pixels. Such a sub-pixel with the transparent layer functions as a white sub-pixel which emits white light to brighten a displayed video on the display surface. The techniques disclosed in Japanese Patent Publication H11-295717 A, however, face a problem that it requires additional processes to form the transparent layer.

Japanese Patent Publication 2011-100025 A proposes formation of a through-hole in one of the red, green and blue color filters, instead of forming the transparent layer. The techniques according to Japanese Patent Publication 2011-100025 A allows more simplified formation of the white sub-pixel than the disclosed technologies in Japanese Patent Publication H11-295717 A.

The aforementioned techniques for enhancing luminance by means of four sub-pixels face various problems. For example, the aforementioned techniques result in increased numbers of source driver pins, source lines and TFTs in comparison with typical RGB systems. This, in turn, leads to an increase in manufacturing costs of the liquid crystal display devices.

The increase in the number of sub-pixels means downsized sub-pixels. For example, the aforementioned techniques have to use sub-pixels, each of which has a size "¾" times as large as a sub-pixel size formed according to typical RGB systems.

If luminance under light emission from the red, green and blue sub-pixels is expressed as a value of "1" and if luminance of the white sub-pixel emitting white light is also expressed as a value of "1", theoretical luminance achieved by the aforementioned techniques is "1.5" times as high as luminance achieved by typical RGB systems ("1" (RGB light emission)×"¾"+"1" (W light emission)×"¾"=1.5).

However, downsizing the sub-pixels and increasing the numbers of source lines and TFIs result in a decrease in an aperture ratio of the sub-pixels (i.e., a light transmission area of the sub-pixels). As a result of the decrease in aperture ratio, the aforementioned theoretical increase in luminance may not be attained.

Technologies to form openings in color filters may degrade video. For example, the opening formed in the color filter may make response speed of liquid crystal slower and cause lower luminance.

It is required for the size of the opening formed in the color filter to be adjusted appropriately in terms of transmittance and color reproducibility. If color reproducibility is important, it may be preferable to form small openings in color filters. In this case, optimal adjustments to color temperatures of backlight and pixel sizes are further required because other portions of the color filter than the openings cause color shifts. If a blue color filter, for example, is formed with an opening, a large red sub-pixel and a large green sub-pixel are required in order to make the remainder of the blue color filter less influential. In addition, the blue color filter has to be small. Therefore, the formation of openings in color filters requires complicated designs for pixels.

SUMMARY

In one general aspect, the instant application describes a liquid crystal display device for displaying a video on a display surface with pixels arranged in a matrix, each of the pixels having three sub-pixels formed with different color filter portion in hue from each other. The display surface includes pixel sets defined so that each of the pixel sets includes two or three of the pixels adjacent to each other in at least one of a vertical direction and a horizontal direction; and an opening is formed on one of the color filter portions every hue in the pixel set.

The liquid crystal display device according to the instant application may display a very bright video easily.

The object, features and advantages of the present implementation will become more apparent from the following detailed description and the attached drawings.

BRIEF DESCRIPTION OF THE DRAWINGS

FIG. 8A is a conceptual view showing averaging processes carried out by an averaging portion of the liquid crystal display device depicted in FIG. 7;

FIG. 8B is a conceptual view showing averaging processes carried out by the averaging portion of the liquid crystal display device depicted in FIG. 7;

FIG. 8C is a conceptual view showing averaging processes carried out by the averaging portion of the liquid crystal display device depicted in FIG. 7;

FIG. 13 is a schematic block diagram showing a liquid crystal display device according to the second embodiment;

FIG. 21B is a conceptual view showing averaging processes carried out by the averaging portion of the liquid crystal display device depicted in FIG. 19;

FIG. 22 is a schematic block diagram showing a liquid crystal display device according to the fifth embodiment;

FIG. 23 is a schematic view showing first and second pixels used as pixels of the liquid crystal display device shown in FIG. 22;

DESCRIPTION OF THE PREFERRED EMBODIMENTS

Figure 1:
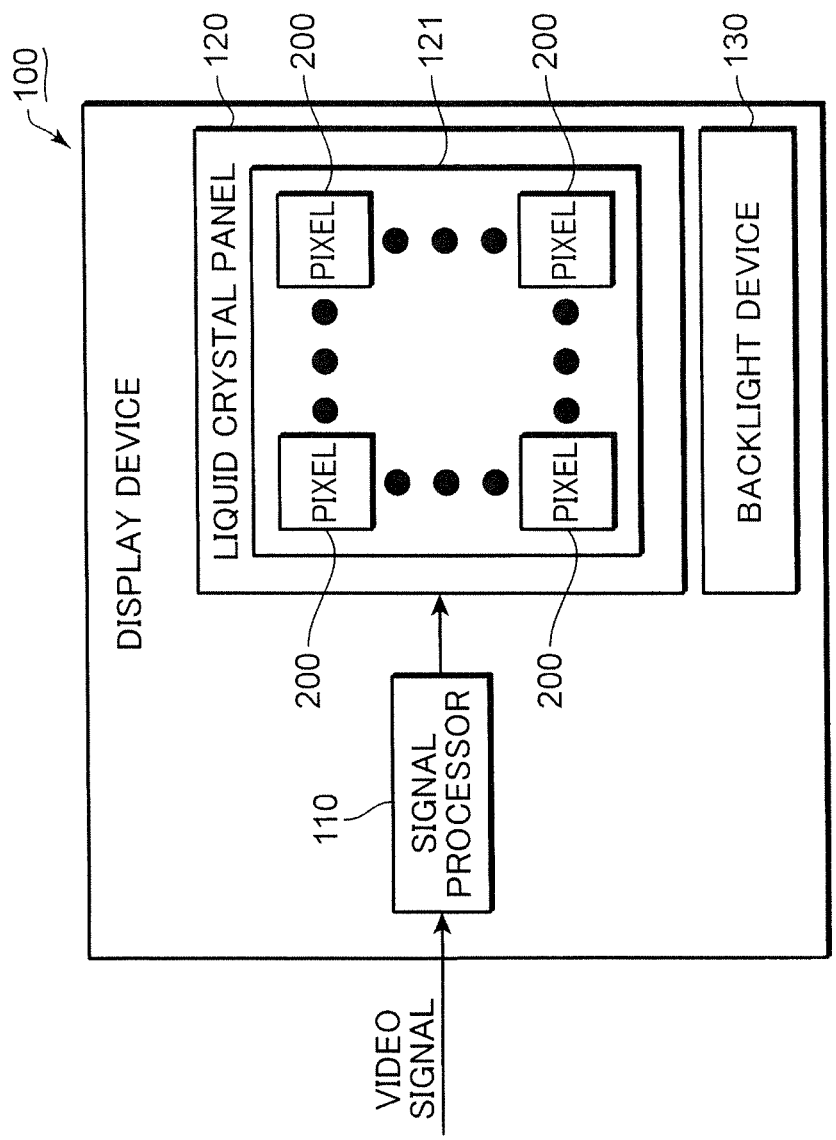
FIG. 1 is a schematic block diagram showing a liquid crystal display device according to the first embodiment.

Liquid crystal display devices according to various embodiments (hereinafter, referred to as "display device(s)") are described with reference to the drawings. It should be noted that similar reference numbers are allocated to similar elements in the following embodiments. For clarification of description, redundant description is omitted as appropriate. Structures, arrangements and shapes shown in the drawings and descriptions with reference to the drawings are only intended to make principles of the embodiments easily understood. Therefore, the principles of the embodiments are in no way limited thereto.

First Embodiment

Display Device

Figure 2:
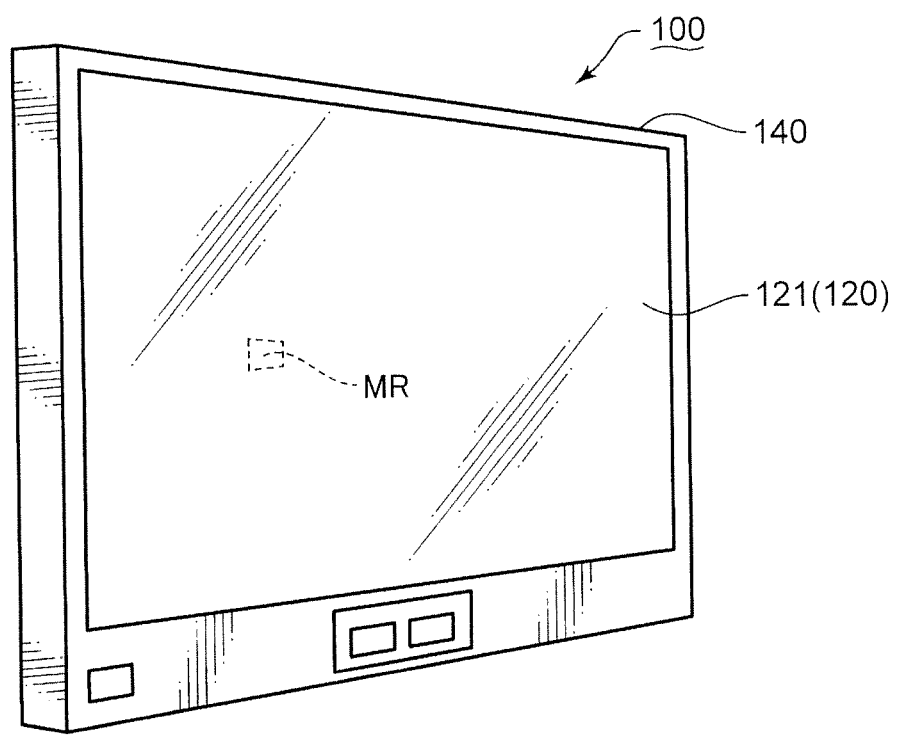
FIG. 2 is a schematic perspective view of the liquid crystal display device shown in FIG. 1.

FIG. 1 is a schematic block diagram showing the display device 100 according to the first embodiment. FIG. 2 is a schematic perspective view of the display device 100. The display device 100 is described with reference to FIGS. 1 and 2.

As shown in FIG. 1, the display device 100 includes a signal processor 110 configured to process video signals, a liquid crystal panel 120 including a display surface 121 configured to display a video in response to the video signals processed by the signal processor 110, and a backlight device 130 configured to emit white illumination light toward the display surface 121. As shown in FIG. 2, the display device 100 further includes a housing 140 which stores and supports the signal processor 110, liquid crystal panel 120 and backlight device 130. The display surface 121 is exposed from the housing 140.

As shown in FIG. 1, the display surface 121 includes pixels 200 arranged in a matrix. The pixels 200 are driven in response to the video signals processed by the signal processor 110 to modulate the illumination light from the backlight device 130. Consequently, a video defined by the video signals is displayed on the display surface 121.

The display device 100 uses two types of the pixels 200 to display a video. In the following description, one of the two types of the pixels 200 is referred to as "first pixel" and the other is referred to as "second pixel". A set of the first and second pixels is exemplified as the pixel set. Each of the first and second pixels includes three sub-pixels from which different lights in hue are emitted.

(Arrangement Pattern of Pixels)
(First Arrangement Pattern)

Figure 3A:
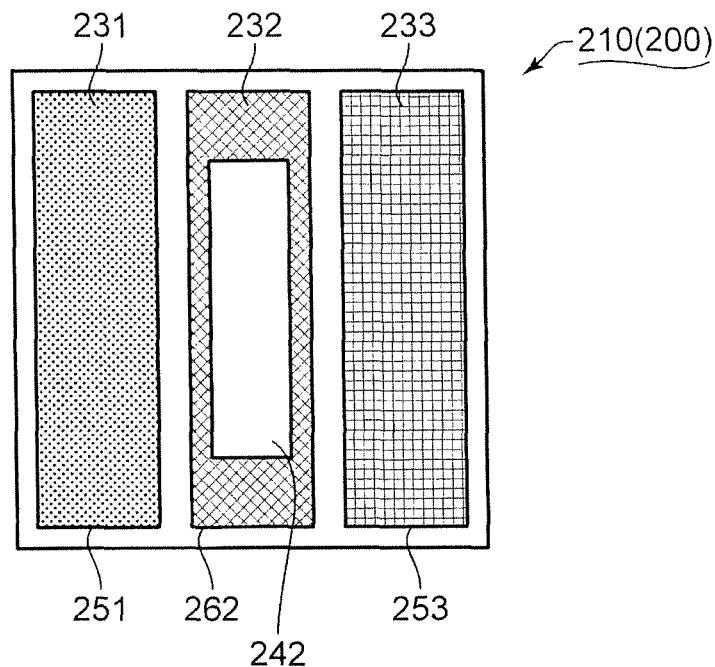
FIG. 3A is a schematic view showing a first pixel of the liquid crystal display device depicted in FIG. 1.
Figure 3B:
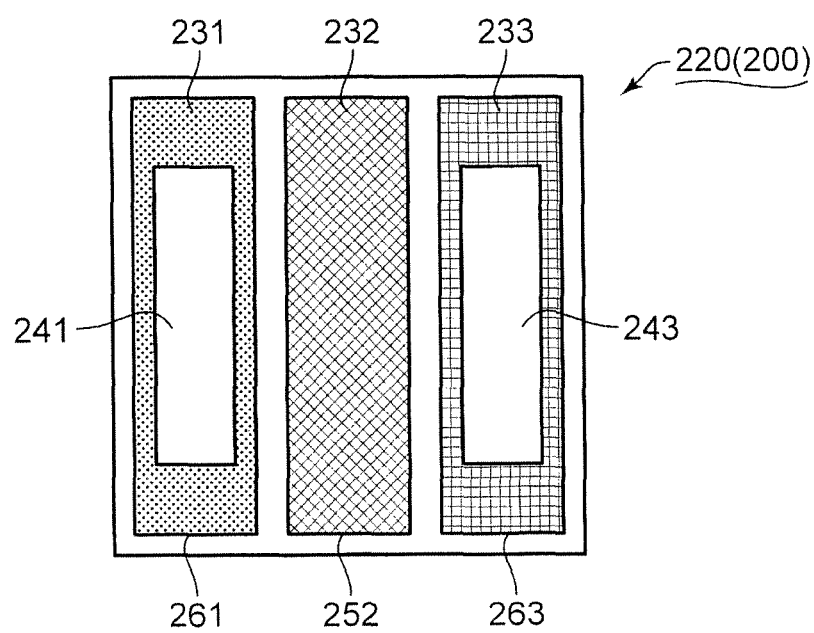
FIG. 3B is a schematic view showing a second pixel of the liquid crystal display device depicted in FIG. 1.

FIG. 3A is a schematic view of the first pixel 210. FIG. 3B is a schematic view of the second pixel 220. The first arrangement pattern of pixels 200 is described with reference to FIGS. 1, 3A and 3B.

The display device 100 includes a red color filter portion 231, which changes the white illumination light emitted from the backlight device 130 into a red hue, a green color filter portion 232, which changes the illumination light into a green hue, and a blue color filter portion 233, which changes the illumination light into a blue hue. Each of these color filter portions (i.e., red, green and blue color filter portions 231, 232, 233), which are different in hue from each other, is used to form three sub-pixels. Each of the first and second pixels 210, 220 includes three sub-pixels. The first and second pixels 210, 220 are arranged in a matrix to form the display surface 121.

The first pixel 210 includes an opened green sub-pixel (hereinafter, referred to as "opened G sub-pixel 262"), which has a green color filter portion 232 formed with an opening 242, an unopened red sub-pixel (hereinafter, referred to as "unopened R sub-pixel 251"), which has a red color filter portion 231, and an unopened blue sub-pixel (hereinafter, referred to as "unopened B sub-pixel 253"), which has a blue color filter portion 233. Unlike the opened G sub-pixel 262, each of the unopened R and B sub-pixels 251, 253 has a color filter portion (i.e., red or blue color filter portion 231, 233) on which there is no opening. Therefore, the unopened R and B sub-pixels 251, 253 emit lights of red and blue hues caused by the red and blue color filter portions 231, 233, respectively whereas the opened G sub-pixel 262 emits light with lower saturation than green light from the green color filter portion 232.

In "first arrangement pattern", the green color filter portion 232 is exemplified as the first color filter portion. The green hue is exemplified as the first hue. The opening 242 formed in the green color filter portion 232 is exemplified as the first opening. The green color filter portion 232 of the opened G sub-pixel 262 is exemplified as the first opened filter portion.

In "first arrangement pattern", one of the red and blue color filter portions 231, 233 is exemplified as the second color filter portion. The other is exemplified as the third color filter portion. One of the red and blue hues is exemplified as the second hue. The other is exemplified as the third hue. One of the unopened R and B sub-pixels 251, 253 is exemplified as the first unopened sub-pixel. The other is exemplified as the third unopened sub-pixel.

The second pixel 220 includes an opened red sub-pixel (hereinafter, referred to as "opened R sub-pixel 261"), which has the red color filter portion 231 formed with an opening 241, an opened blue sub-pixel (hereinafter, referred to as "opened B sub-pixel 263"), which has the blue color filter portion 233 formed with an opening 243, and an unopened green sub-pixel (hereinafter, referred to as "unopened G sub-pixel 252"), which has the green color filter portion 232. Unlike the opened R and B sub-pixels 261, 263, the unopened G sub-pixel 252 has the green color filter portion 232 on which there is no opening. Therefore, the unopened G sub-pixel 252 emits light in a green hue caused by the green filter portion 232 whereas the opened R and B sub-pixels 261, 263 emit lights of lower saturation than red and blue lights from the red and blue color filter portions 231, 233, respectively.

In "first arrangement pattern", one of the openings 241, 243 formed in the red and blue filter color portions 231, 233 is exemplified as the second opening. The other is exemplified as the third opening. One of the opened R and B sub-pixels 261, 263 is exemplified as the second opened sub-pixel. The other is exemplified as the third opened sub-pixel. The unopened G sub-pixel 252 is exemplified as the second unopened sub-pixel.

In the present embodiment, each of the pixel sets forming the display surface 121 includes the first and second pixels 210, 220 (described later). As described above, one opening is formed in a color filter portion (red, green and blue color filter portion 231, 232, 233) every hue (red, green and blue) in a pixel set consisting of the first and second pixels 210, 220. The opened G sub-pixel 262 of the first pixel 210 is situated between the unopened R and B sub-pixels 251, 253. The unopened G sub-pixel 252 of the second pixel 220 is situated between the opened R and B sub-pixels 261, 263. Therefore, the openings 241, 242, 243 are distributed in the pixel set. This makes the openings 241, 242, 243 less influential on a video.

Figure 4:
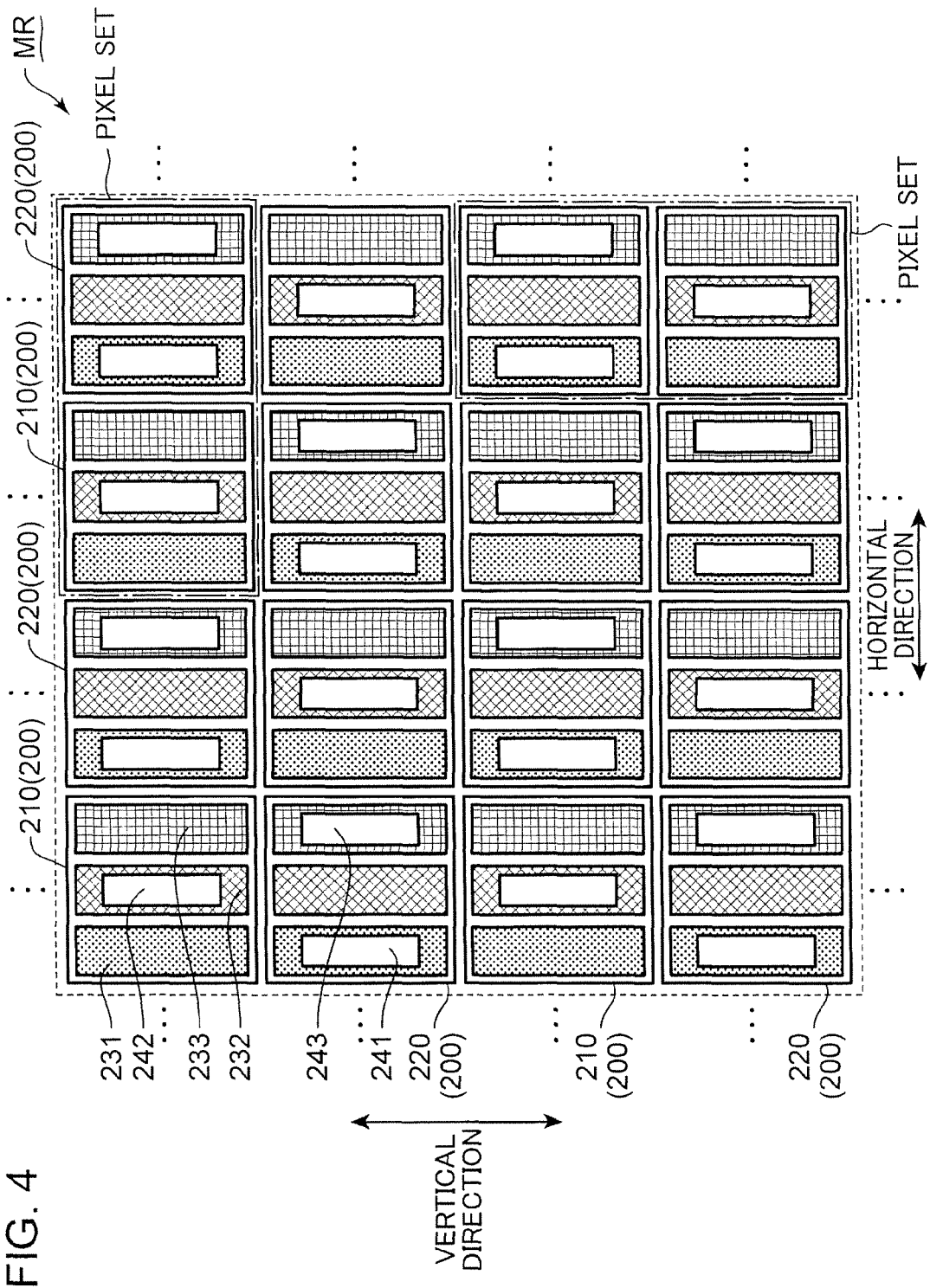
FIG. 4 is a schematic view showing the first arrangement pattern of pixels in the liquid crystal display device depicted in FIG. 1.

FIG. 4 is a schematic view showing the first arrangement pattern of the pixels 200. The first arrangement pattern of the pixels 200 is described with reference to FIGS. 1, 2 and 4.

A micro-region MR framed in by the dotted line is depicted on the display surface 121 of the display device 100 in FIG. 2. FIG. 4 schematically shows an arrangement pattern of the pixels 200 in the micro-region MR. The description with reference to FIG. 4 may be applicable to the entire display surface 121.

White illumination light emitted from the backlight device 130 may be allowed to pass through the openings 241, 242, 243, which leads to an improvement in luminance of the display surface 121. The openings 241, 242, 243, however, may cause emission colors of the pixels 200 different from colors defined by video signals. This means that the openings 241, 242, 243 may make color reproducibility worse.

In the present embodiment, the first and second pixels 210, 220 are different in opening pattern from each other. The first and second pixels 210, 220 are arranged with a substantially constant density over the entire display surface 121. Therefore, the openings 241, 242, 243 may be less likely to locally give strong effects on a video on the display surface 121. Each size of the openings 241, 242, 243 may be designed so that the first and second pixels 210, 220 emit lights at substantially equal luminance if the video signals instruct emission of the first and second pixels 210, 220 at equal luminance. Consequently, the first and second pixels 210, 220 may maintain high color reproducibility.

In "first arrangement pattern", the first and second pixels 210, 220 are arranged to form a zigzag stitch pattern. Specifically, the first and second pixels 210, 220 are arranged alternately in the horizontal and vertical directions.

In "first arrangement pattern", the first and second pixels 210, 220 situated adjacently to each other in the horizontal direction may be defined as the pixel set. Alternatively, the first and second pixels 210, 220 situated adjacently to each other in the vertical direction may be defined as the pixel set.

(Second Arrangement Pattern)

Figure 5:
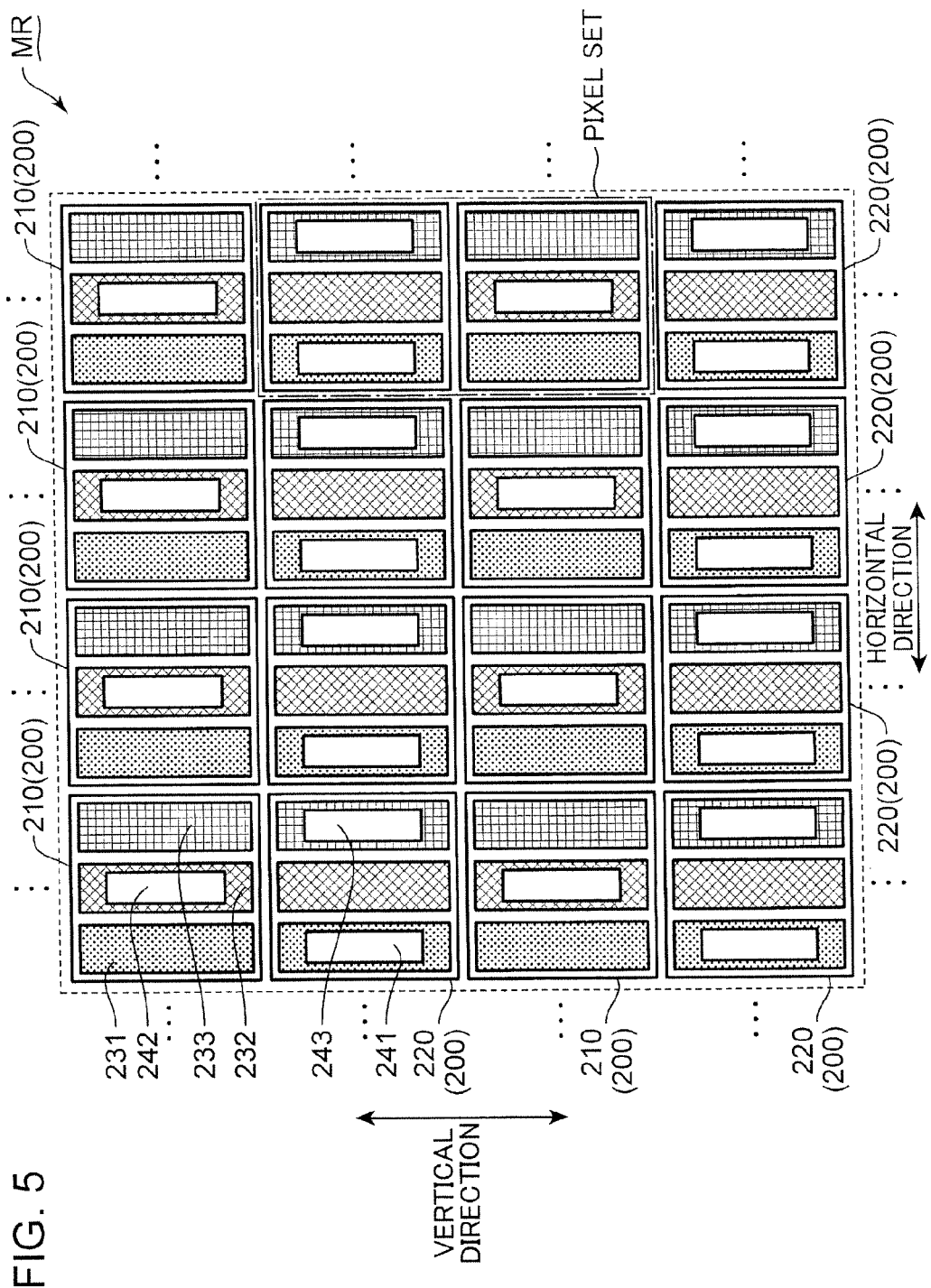
FIG. 5 is a schematic view showing the second arrangement pattern of pixels in the liquid crystal display device depicted in FIG. 1.

FIG. 5 is a schematic view showing the second arrangement pattern of the pixels 200. The second arrangement pattern of the pixels 200 is described with reference to FIGS. 1, 4 and 5.

Like the first arrangement pattern, the first and second pixels 210, 220 according to the second arrangement pattern are arranged alternately in the vertical direction. Unlike the first arrangement pattern, lines of horizontally aligned first pixels 210 and lines of horizontally aligned second pixels 220 are formed on the display surface 121.

In the first arrangement pattern, the first and second pixels 210, 220 are arranged alternately in the vertical and horizontal directions. Therefore, effects from the openings 241, 242, 243 are more scattered than the second arrangement pattern. Accordingly, the first arrangement pattern may achieve higher color resolution than the second arrangement pattern.

In the second arrangement pattern, the first and second pixels 210, 220 are aligned in the horizontal direction. Therefore, the second arrangement pattern may be formed by simpler opening processes (processes for forming the openings 241, 242, 243) than the first arrangement pattern.

In "second arrangement pattern", the first and second pixels 210, 220 situated adjacently to each other in the vertical direction may be defined as the pixel set.

(Third Arrangement Pattern)

Figure 6:
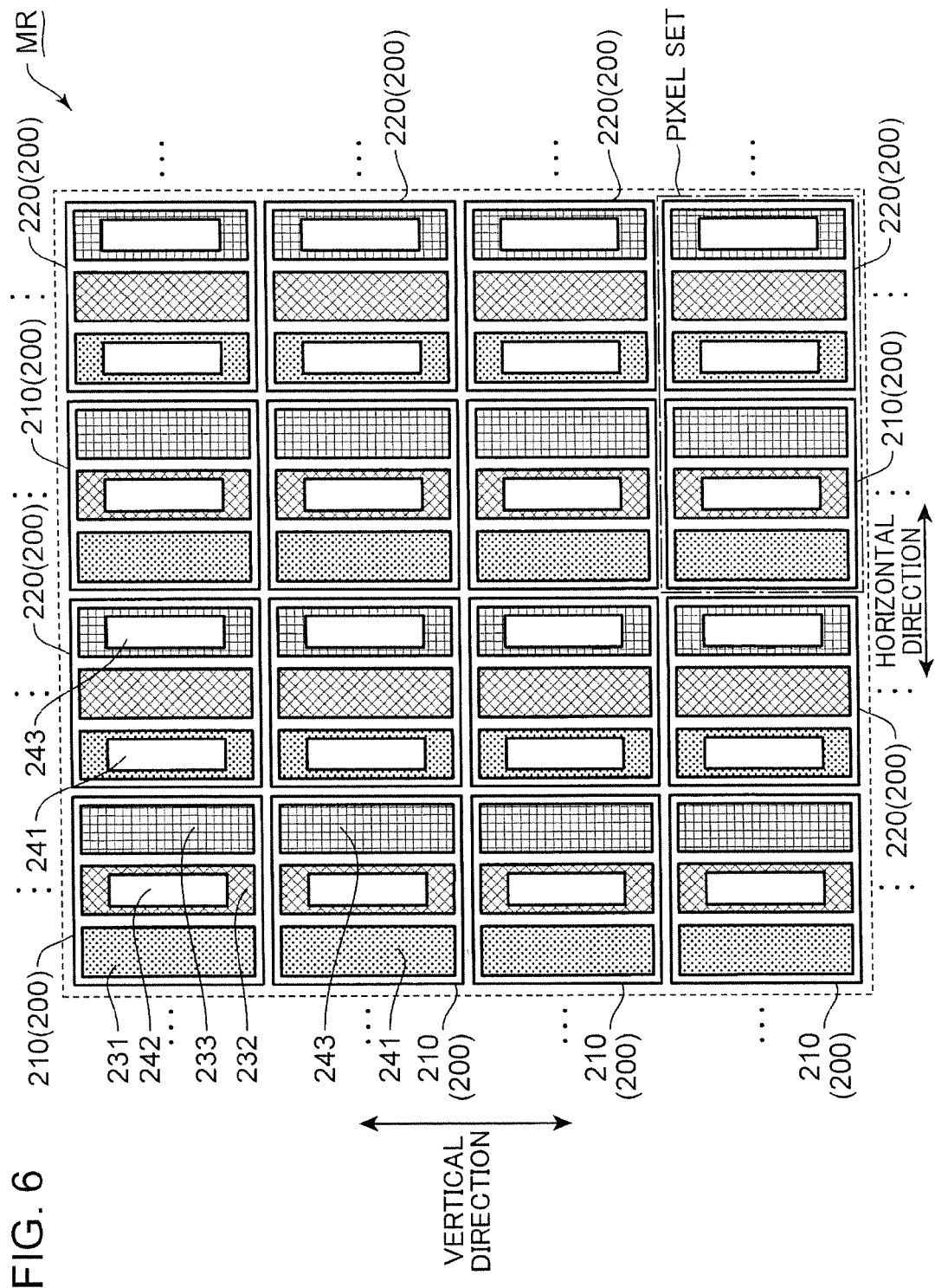
FIG. 6 is a schematic view showing the third arrangement pattern of pixels in the liquid crystal display device depicted in FIG. 1.

FIG. 6 is a schematic view showing the third arrangement pattern of the pixels 200. The third arrangement pattern of the pixels 200 is described with reference to FIGS. 1, 4 and 6.

Like the first arrangement pattern, the first and second pixels 210, 220 according to the third arrangement pattern are arranged alternately in the horizontal direction. Unlike the first arrangement pattern, lines of vertically aligned first pixels 210 and lines of vertically aligned second pixels 220 are formed on the display surface 121.

In the first arrangement pattern, the first and second pixels 210, 220 are arranged alternately in the vertical and horizontal directions. Therefore, the effects from the openings 241, 242, 243 are more scattered than in the third arrangement pattern. Therefore, the first arrangement pattern may achieve higher color resolution than the third arrangement pattern.

In the third arrangement pattern, the first and second pixels 210, 220 are aligned in the vertical direction. Therefore, the third arrangement pattern may be formed by simpler opening processes (processes for forming the openings 241, 242, 243) than the first arrangement pattern.

In "third arrangement pattern", the first and second pixels 210, 220 situated adjacently to each other in the horizontal direction may be defined as the pixel set.

(Signal Process)

Figure 7:
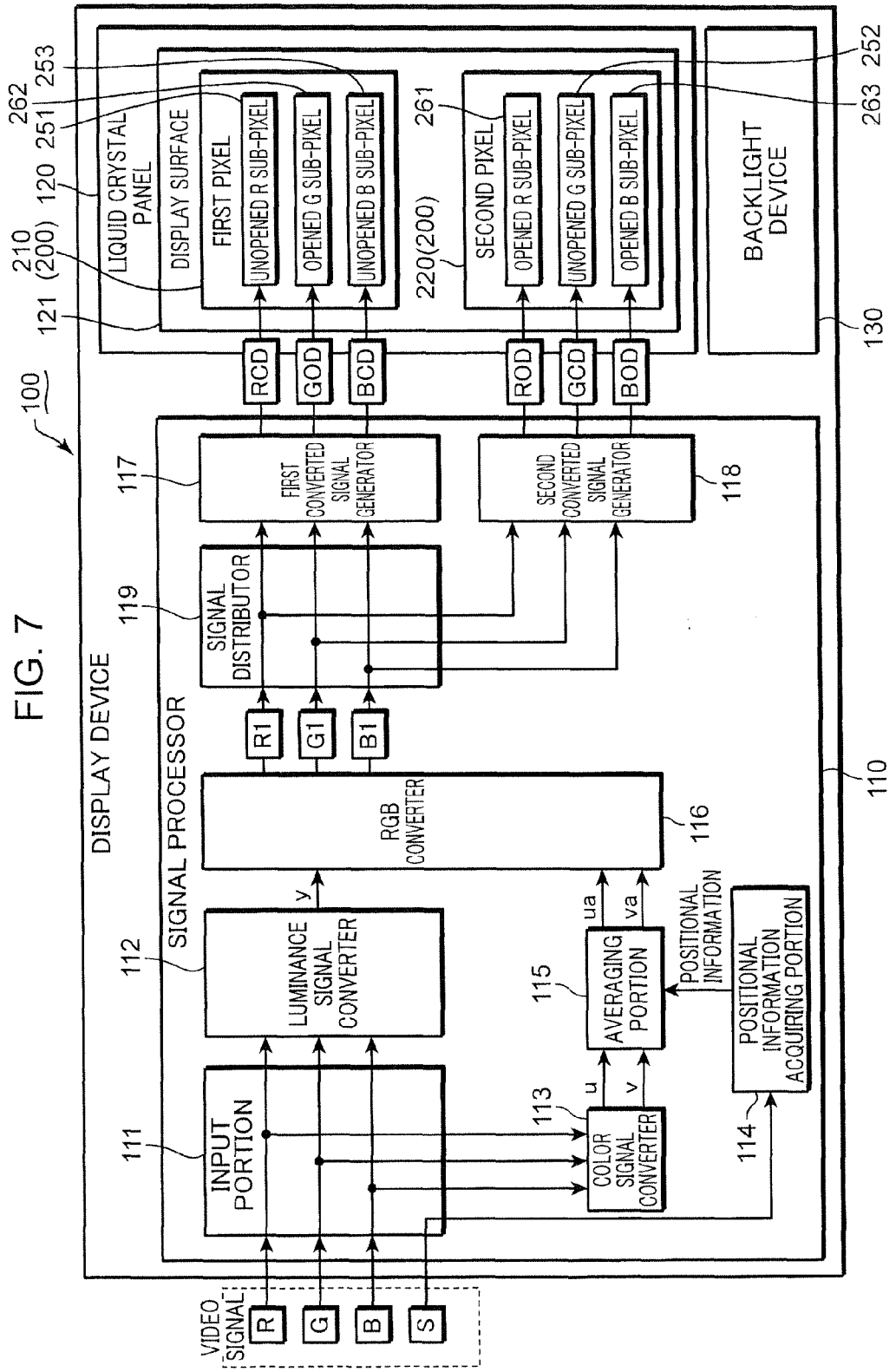
FIG. 7 is a schematic block diagram of the liquid crystal display device shown in FIG. 1.

FIG. 7 is a schematic block diagram of the display device 100. Signal processes of the video signal with reference to FIGS. 4 and 7.

The signal processor 110 includes an input portion 111, to which video signals are input to display a video. The video signals define emission color and luminance of each pixel 200 by means of red, green and blue hues. In FIG. 7, a video signal component to define emission luminance of a red hue is expressed by "R". Another video signal component to define emission luminance of a green hue is expressed by "G". The other video signal component to define emission luminance of a blue hue is expressed by "B".

If the signal processor 110 outputs drive signals without taking account of the openings 241, 242, 243 like typical display devices, a displayed video on the display surface 121 may largely differ from a video defined by video signals. In the present embodiment, the signal processor 110 processes signals to appropriately display a video defined by video signals on the display surface 121 under presence of the openings 241, 242, 243.

The signal processor 110 further includes a luminance signal converter 112 configured to output a luminance signal "y" as information about the luminance in response to the video signal, and a color signal converter 113 configured to output a signal "u", which indicates a difference between the luminance signal "y" and the blue color component, and a signal "v", which indicates a difference between the luminance signal "y" and the red color component, in response to the video signal. The input portion 111 outputs the video signal to the luminance signal converter 112 and color signal converter 113. In the present embodiment, the signal processor 110 generates the luminance signal and the color signal in accordance with the YUV method. Alternatively, the signal processor may separate the video signal into luminance components and color components in accordance with other methods. For example, the signal processor may separate the video signal into luminance components and color components in accordance with the Lab method or the Hsv method.

The signal processor 110 further includes a positional information acquiring portion 114 which acquires positional information to identify a position of a target pixel 200. The video signal includes vertical synchronous signals and horizontal synchronous signals. The input portion 111 outputs these synchronous signals to the positional information acquiring portion 114. In FIG. 7, the synchronous signals included in the video signal are represented by the reference symbol "S".

The signal processor 110 further includes an averaging portion 115 configured to average the color signals "u", "v" associated with the first pixel 210 and the color signals "u", "v" associated with the second pixel 220. The positional information acquiring portion 114 outputs positional information about a position of a target pixel 200 to the averaging portion 115. The averaging portion 115 sets a region of the pixels 200, which is subjected to the averaging processes, on the basis of the positional information. The averaging portion 115 then carries out the averaging processes for the color signals "u", "v" associated with the first and second pixels 210, 220 in the set region. The averaging processes carried out by the averaging portion 115 are described later.

The signal processor 110 further includes an RGB converter 116.

The luminance signal "y" generated in response to the video signal is output from the luminance signal converter 112 to the RGB converter 116. The averaging portion 115 carries out the averaging processes for the color signals "u" associated with the first and second pixels 210, 220 to generate a color signal "ua". The averaging portion 115 carries out the averaging processes for the color signals "v" associated with the first and second pixels 210, 220 to generate a color signal "va". The color signals "ua", "va" are output to the RGB converter 116. In the present embodiment, the color signals "ua", "va" are exemplified as the averaged color signals.

The RGB converter 116 generates a signal "R1" defining emission luminance of the red hue, a signal "G1" defining emission luminance of the green hue and a signal "B1" defining emission luminance of the blue hue in response to the luminance signal "y" and the color signals "ua", "va". The RGB converter 116 may generate these signals "R1", "G1", "B1" by means of inverting processes which are reverse of the separating processes carried out by the luminance signal converter 112 and the color signal converter 113 in accordance with the YUV method. If the signal processor separates the video signal into luminance components and color components in accordance with the Lab method, the RGB converter may carry out inverting processes, which are reverse of the separating processes, to generate the signals "R1", "G1", "B1". If the signal processor carries out separating processes to separate the video signal into luminance components and color components in accordance with the Hsv method, the RGB converter may carry out inverting processes, which are reverse of the separating processes, to generate the signals "R1", "G1", "B1".

The signal processor 110 further includes a first converted signal generator 117 configured to generate drive signals for driving the first pixels 210, a second converted signal generator 118 configured to generate drive signals for driving the second pixels 220, and a signal distributor 119 configured to distribute the signals "R1", "G1", "B1" generated and output from the RGB converter 116 to the first and second converted signal generators 117, 118.

As described above, the first pixels 210 includes the unopened R sub-pixel 251, opened G sub-pixel 262, and unopened B sub-pixel 253. The first converted signal generator 117 generates a drive signal "RCD" for driving the unopened R sub-pixel 251, a drive signal "GOD" for driving the opened G sub-pixel 262 and a drive signal "BCD" for driving the unopened B sub-pixel 253 in response to the output signals "R1", "G1", "B1" from the RGB converter 116. The liquid crystal panel 120 drives the unopened R sub-pixel 251, opened G sub-pixel 262 and unopened B sub-pixel 253 in response to the drive signals "RCD", "GOD", "BCD".

As described above, the second pixels 220 includes the opened R sub-pixel 261, unopened G sub-pixel 252 and opened B sub-pixel 263. The second converted signal generator 118 generates a drive signal "ROD" for driving the opened R sub-pixel 261, a drive signal "GCD" for driving the unopened G sub-pixel 252 and a drive signal "BOD" for driving the opened B sub-pixel 263 in response to the output signals "R1", "G1", "B1" from the RGB converter 116. The liquid crystal panel 120 drives the opened R sub-pixel 261, unopened G sub-pixel 252 and opened B sub-pixel 263 in response to the drive signals "ROD", "GCD", "BOD".

In the present embodiment, as a result of a series of signal processing operations by the RGB converter 116 and the first converted signal generator 117, the drive signals "RCD", "GOD", "BCD" are generated to determine the luminance of the unopened R sub-pixel 251, opened G sub-pixel 262 and unopened B sub-pixel 253. Likewise, as a result of a series of signal processing operations by the RGB converter 116 and the second converted signal generator 118, the drive signals "ROD", "GCD", "BOD" are generated to determine the luminance of the opened R sub-pixel 261, unopened G sub-pixel 252 and opened B sub-pixel 263. Therefore, the RGB converter 116 and the first and second converted signal generators 117, 118 are exemplified as the luminance determining portion.

The first and second converted signal generators 117, 118 may generate drive signals in accordance with a table or matrix technologies. Each of the first and second converted signal generators 117, 118 may store matrix functions to output drive signals in response to values defined by the output signals from the RGB converter 116. Alternatively, each of the first and second converted signal generators 117, 118 may store a data table to output drive signals by referring values defined by the output signals from the RGB converter 116. The drive signal generating method may be appropriately determined on the basis of known conversion techniques for converting video signals to drive signals and design parameters of the first and second pixels 210, 220 (e.g., a size of the openings 241, 242, 243 and transmittance of the color filters portions (red, green and blue color filter portions 231, 232, 233)). Therefore, the principle of the present embodiment is in no way limited to the drive signal generating method.

(Averaging Process)

FIGS. 8A to 8C are conceptual views showing the averaging processes carried out by the averaging portion 115. The averaging processes are described with reference to FIGS. 5 to 8C. It should be noted that the pixels 200 shown in FIGS. 8A to 8C are arranged in accordance with the first arrangement pattern.

The signal processor 110 shown in FIG. 7 processes each pixel 200 for luminance components of the video signal (i.e., luminance signal "y") whereas the signal processor 110 handles several pixels 200 as one pixel to process the video signals for the color components of the video signals (i.e., color signals "u", "v"). FIGS. 8A to 8C depict a pixel region PR with the dotted line which includes several pixels 200 handled as one pixel in the averaging processes.

The averaging portion 115 sets the pixel region PR so as to include least one first pixel 210 and at least one second pixel 220. As described with reference to FIG. 7, the averaging portion 115 averages emission colors, which are assigned to the first and second pixels 210, 220 by the video signal, in the pixel region PR on the basis of the color signals "u", "v" generated by the color signal converter 113.

In FIG. 8A, the averaging portion 115 sets the pixel region PR to include the first and second pixels 210, 220, which are aligned in the vertical direction. The method for setting the pixel region PR shown in FIG. 8A is applicable to the pixels 200 arranged in the second arrangement pattern described with reference to FIG. 5.

In FIG. 8B, the averaging portion 115 sets the pixel region PR to include the first and second pixels 210, 220, which are aligned in the horizontal direction. The method for setting the pixel region PR shown in FIG. 8B is applicable to the pixels 200 arranged in the third arrangement pattern described with reference to FIG. 6.

The averaging process shown in FIG. 8A is executed vertically. The averaging process shown in FIG. 8B is executed horizontally. Therefore, as a result of these averaging processes, there may be noticeable unbalance in color resolution between the vertical and horizontally directions.

In FIG. 8C, the averaging portion 115 sets the pixel region PR including two first pixels and two second pixels which are arranged in the horizontal and vertical directions. The averaging process shown in FIG. 8C is executed in the vertical and horizontal directions evenly to make unbalance in color resolution less noticeable between the vertical and horizontal directions. The method for setting the pixel region PR shown in FIG. 8C is advantageously applicable to the pixels 200 arranged in any one of the first to third arrangement patterns.

The averaging portion 115 may previously store information about a reference pixel, which is used as a reference for setting the pixel region PR. If the first pixel 210 in the pixel region PR shown in FIG. 8A is used as the reference pixel, the averaging portion 115 may identify the second pixel 220 below the reference pixel (first pixel 210) as the pixel 200, which is subjected to the averaging process together with the reference pixel (first pixel 210), on the basis of the positional information from the positional information acquiring portion 114. If the first pixel 210 in the pixel region PR shown in FIG. 8B is used as the reference pixel, the averaging portion 115 may identify the second pixel 220 beside the reference pixel (first pixel 210) as the pixel 200, which is subjected to the averaging process together with the reference pixel (first pixel 210), on the basis of the positional information from the positional information acquiring portion 114. If the upper first pixel 210 in the pixel region PR shown in FIG. 8C is used as the reference pixel, the averaging portion 115 may identify the second pixel 220 beside the reference pixel (upper first pixel 210), the second pixel 220 below the reference pixel (upper first pixel 210) and the first pixel 210 adjacent to these second pixels 220 as the pixels 200, which are subjected to the averaging process together with the reference pixel (upper first pixel 210), on the basis of the positional information from the positional information acquiring portion 114.

Figure 9:
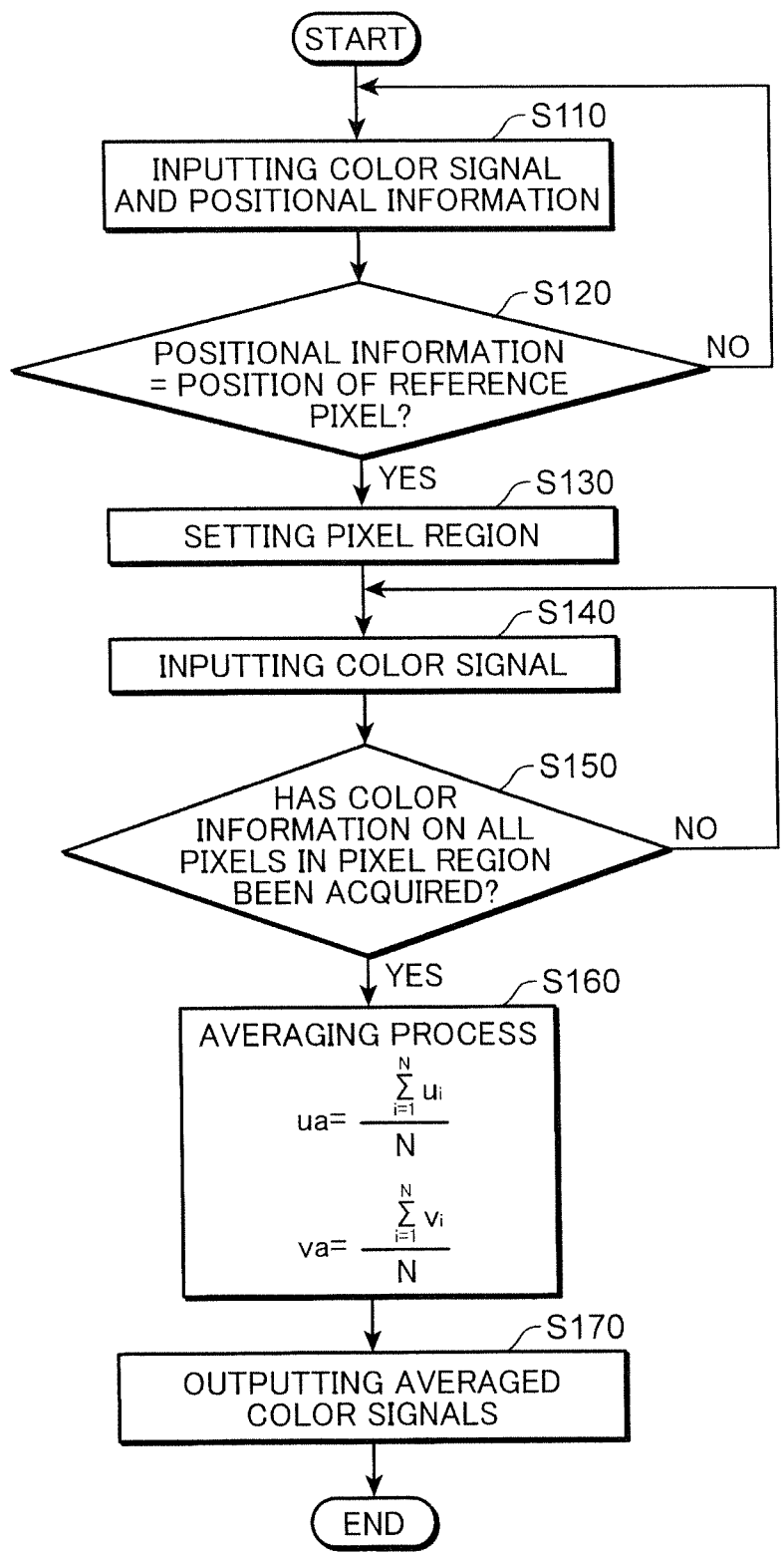
FIG. 9 is a flowchart of the averaging processes carried out for one pixel region by the averaging portion depicted in FIGS. 8A to 8C.

FIG. 9 is a flowchart of the averaging process carried out by the averaging portion 115 for one pixel region PR. The averaging process is further described with reference to FIGS. 7 to 9.

(Step S110)

In step S110, the color signals "u", "v" for a pixel 200 are input from the color signal converter 113 to the averaging portion 115. The positional information about the pixel 200 is input from the positional information acquiring portion 114 to the averaging portion 115. Step S120 is then carried out.

(Step S120)

In step S120, the positional information input in step S110 is compared to information about a position of the reference pixel previously stored in the averaging portion 115. If the positional information input in step S110 indicates the position of the reference pixel, step S130 is carried out. Otherwise, step S110 is carried out.

(Step S130)

In step S130, the pixel region PR is set by means of the reference pixel as a reference. Step S140 is then carried out.

(Step S140)

In step S140, the color signals "u", "v" are input from the color signal converter 113 to the averaging portion 115. Step S150 is then carried out.

(Step S150)

In step S150, the averaging portion 115 determines whether or not color information about all the pixels 200 in the pixel region PR is acquired. If the color information about all the pixels 200 in the pixel region PR is acquired, step S160 is carried out.

(Step S160)

In step S160, the averaging process is carried out. Calculations in step S160 are described later. Once the calculations in step S160 are completed, step S170 is carried out.

(Step S170)

In step S170, the averaged color signals "ua", "va" worked out by the calculations in step S160 are output from the averaging portion 115 to the RGB converter 116.

Figure 10:
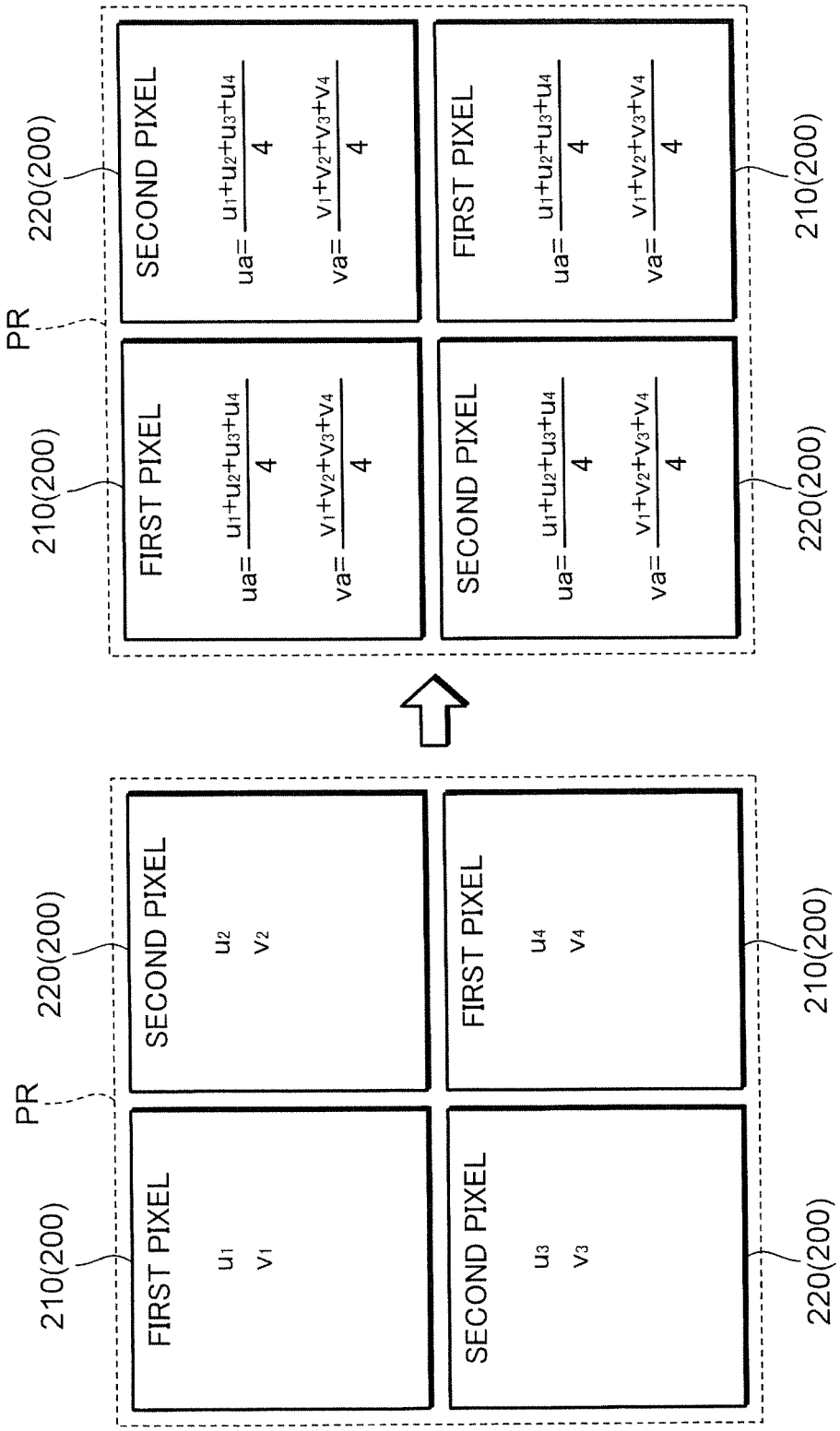
FIG. 10 is a conceptual view showing operations performed in steps S140 to S170 of the flowchart depicted in FIG. 10.

FIG. 10 is a conceptual view showing operations performed in steps S140 to S170 of the signal processes described with reference to FIG. 9. The signal processes carried out in steps S140 to S170 are further described with reference to FIGS. 7 to 10.

FIG. 10 schematically shows the pixel region PR described with reference to FIG. 8C. The following processing principle may be applicable to signal processes using the pixel regions PR described with reference to FIGS. 8A and 8B.

In a processing routine performed between steps S140, S150, values defined by the color signals "u", "v" are assigned to the four pixels 200 included in the pixel region PR, respectively. In FIG. 10, values "$u_1$", "$v_1$" defined by the color signals are assigned to the upper first pixel 210. Values "$u_2$", "$v_2$" defined by the color signals are assigned to the upper second pixel 220. Values "$u_3$", "$v_3$" defined by the color signals are assigned to the lower second pixel 220. Values "$u_4$", "$v_4$" defined by the color signals are assigned to the lower first pixel 210.

The following equations show exemplary calculating expressions used in step S160. Any other suitable calculating method may be used for the averaging process.

In the present embodiment, there is the same number of the first pixels 210 in the pixel region as the second pixels 220. Alternatively, there may be a different number of the first pixels 210 from the second pixels 220 in the pixel region PR. In this case, a calculating method to take account of the difference in number between the first and second pixels 210, 220 may be used (e.g., a weight coefficient).

$$ua = \frac{\sum_{i=1}^{N} u_i}{N} \qquad \text{[Equation 1]}$$

$$va = \frac{\sum_{i=1}^{N} v_i}{N} \qquad \text{[Equation 2]}$$

Since the pixel region PR shown in FIG. 10 includes the four pixels 200, the parameter "N" in the aforementioned equations has a value of "4". If the pixel region PR described with reference to FIGS. 8A and 8B is used, the pixel region PR includes two pixels 200. Accordingly, the parameter "N" has a value of "2".

In step S160, the averaging process is carried out by means of the values assigned to the pixels 200 in the pixel region PR and the aforementioned equations. Consequently, the values "ua", "va" worked out from the following equations are assigned to all the pixels 200 in the pixel region PR.

$$ua = \frac{u_1 + u_2 + u_3 + u_4}{4} \qquad \text{[Equation 3]}$$

$$va = \frac{v_1 + v_2 + v_3 + v_4}{4} \qquad \text{[Equation 4]}$$

As described above, the averaged color signals "ua", "va", each of which has an equal value for all the pixels 200 in the pixel region PR, are output to the RGB converter 116.

Figure 11:
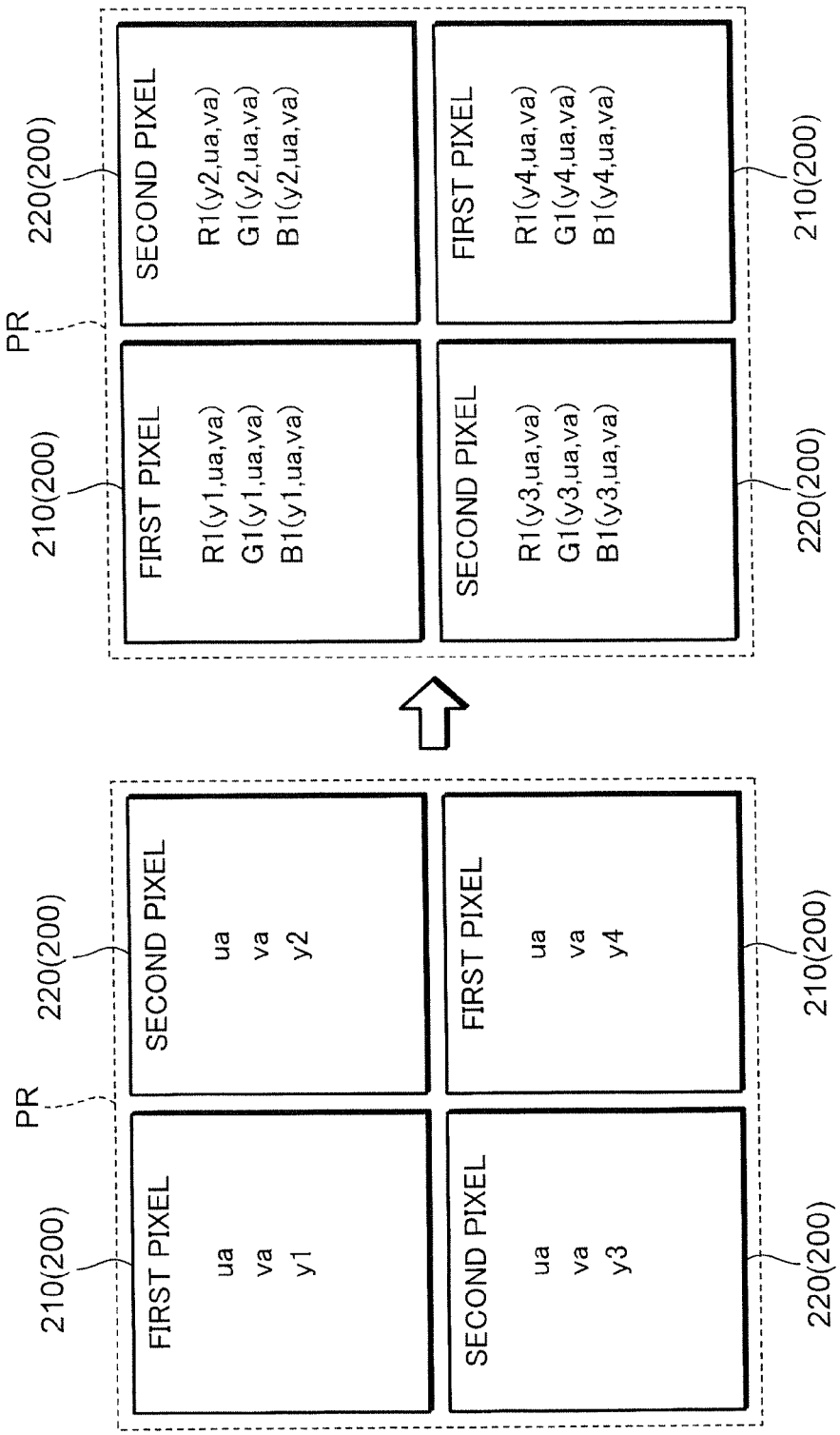
FIG. 11 is a conceptual view showing processes carried out by an RGB converter of the liquid crystal display device depicted in FIG. 7.

FIG. 11 is a conceptual view showing processes carried out by the RGB converter 116. The signal processes carried out by the RGB converter 116 is described with reference to FIGS. 7, 10 and 11. The pixel region PR shown in FIG. 11 corresponds to that described with reference to FIG. 10.

As shown in FIG. 7, the luminance signal "y" and the averaged color signals "ua", "va" are input to the RGB converter 116. As described with reference to FIG. 10, the color signals "ua", "va", each of which defines an equal value for the four pixels 200 in the pixel region PR, are input to the RGB converter 116. On the other hand, the luminance signal "y" does not have to assign an equal value to all the pixels 200 in the pixel region PR. In FIG. 11, a value "y1" defined by the luminance signal "y" is assigned to the upper first pixel 210. A value "y2" defined by the luminance signal "y" is assigned to the upper second pixel 220. A value "y3" defined by the luminance signal "y" is assigned to the lower second pixel 220. A value "y4" defined by the luminance signal "y" is assigned to the lower first pixel 210.

As shown in FIG. 11, the RGB converter 116 generates the video signal again in response to the luminance signal "y" and the averaged color signals "ua", "va". The values "ua", "va" of the color signals assigned to the pixels 200 in the pixel region PR are common to the pixels 200 in the pixel region PR whereas the value assigned by the luminance signal "y" is not always common to the pixels 200 in the pixel region PR. Therefore, the video signals "R1", "G1", "B1" output to the pixels 200 in the pixel region PR may be different in response to the luminance signal "y". However, since the color components for the pixels 200 in the pixel region PR are averaged, the opened R, G and B sub-pixels 261, 262, 263 become less influential on the color resolution.

(Another Method for Setting Pixel Region)

Figure 12:
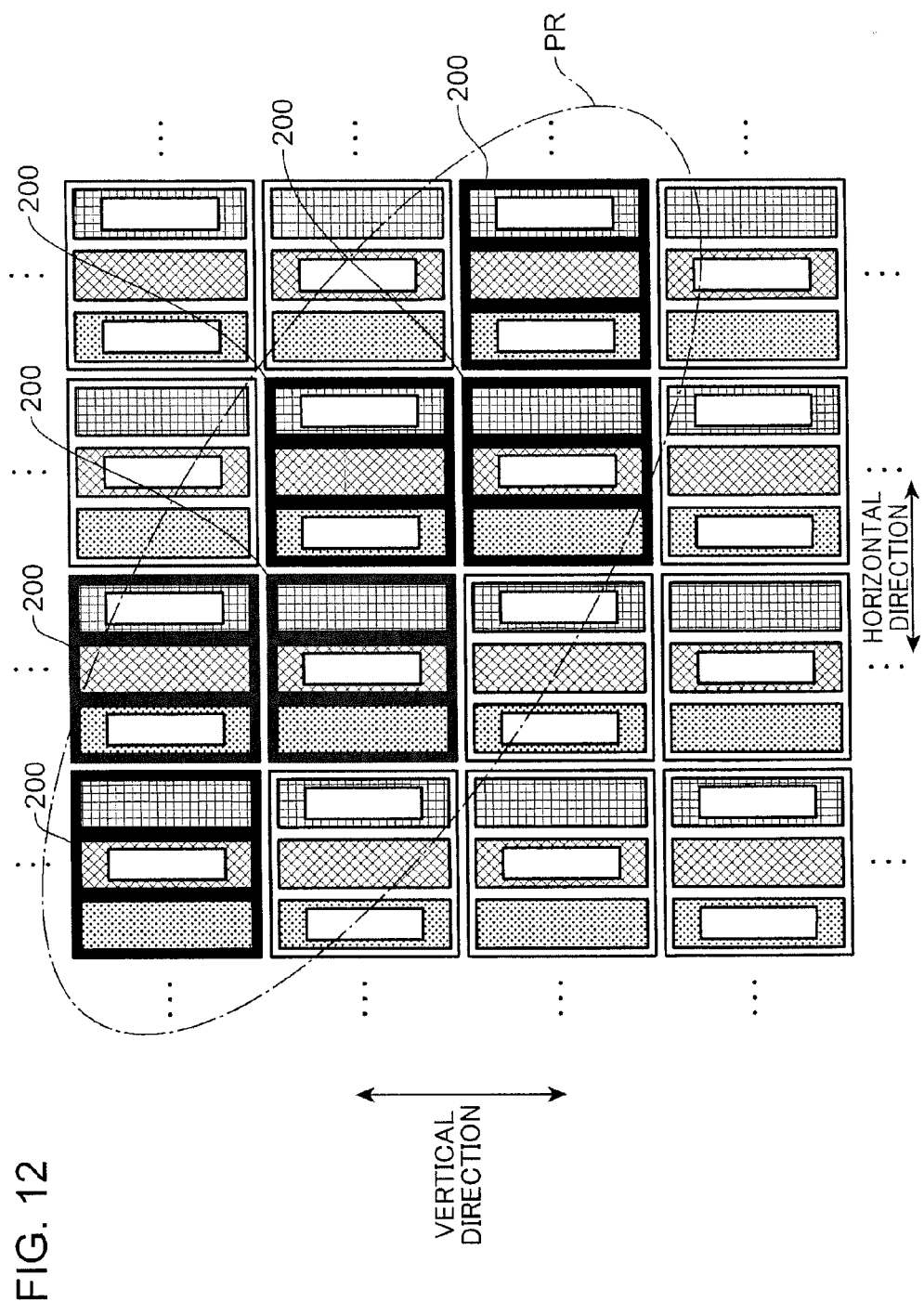
FIG. 12 is a conceptual view showing a setting method for a pixel region by the averaging portion of the liquid crystal display device depicted in FIG. 7.

FIG. 12 is a conceptual view showing another method for setting the pixel region PR. The other method for setting the pixel region PR is described with reference to FIGS. 7 and 12.

The averaging portion 115 may find out a correlation about the color signals "u", "v" from the color signal converter 113 between the pixels 200 in a predetermined region of the display surface 121. The averaging portion 115 may set the pixel region PR on the basis of the correlation about the color signals "u", "v" between the pixels 200.

In FIG. 12, the color signals "u", "v" assign values, which are approximate to each other, to the painted pixels 200 in black. The averaging portion 115 may set a pixel region PR to include these pixels 200 and carry out the aforementioned averaging process. Consequently, the averaging process may cause little degradation in color resolution.

The principle of the present embodiment is not limited to specific methods for setting the pixel region PR. The pixel region PR may be set in accordance with any other suitable methods.

Second Embodiment

Display Device

FIG. 13 is a schematic block diagram showing a display device 100A according to the second embodiment. In FIG. 13, similar reference numbers are allocated to similar elements to elements of the display device 100 described in the context of the first embodiment. The description in the first embodiment is applied to these elements.

Like the display device 100 described in the context of the first embodiment, the display device 100A includes the backlight device 130 and the liquid crystal panel 120. The display device 100A further includes a signal processor 110A configured to process video signals.

Like the signal processor 110 described in the context of the first embodiment, the signal processor 110A includes the input portion 111, the luminance signal converter 112, the color signal converter 113, the positional information acquiring portion 114, the averaging portion 115, the RGB converter 116, and the signal distributor 119. The signal processor 110A further includes an emission mode selector 150 configured to select an emission mode of the pixels 200 in the display surface 121, and a converted signal generator 160 configured to change a processing mode for video signals ("R1", "G1", "B1") generated by the RGB converter 116 in response to signals from the emission mode selector 150.

For example, the emission mode selector 150 may output a first or second mode signal (hereinafter, referred to as "mode signal") to the converted signal generator 160 in response to operations performed by a user.

The converted signal generator 160 includes a first converted signal generator 117A configured to generate drive signals ("RCD", "GOD", "BCD") for driving the first pixels 210 in response to the video signals generated by the RGB converter 116 and a second converted signal generator 118A configured to generate drive signals ("ROD", "GCD", "BOD") for driving the second pixels 220 in response to the video signals generated by the RGB converter 116. The first and second converted signal generators 117A, 118A change algorithms for generating the drive signals in response to the mode signals. Accordingly, emission operation of the pixels 200 may be different between a condition in which the first mode signal is output (first emission mode) and a condition in which the second mode signal is output (second emission mode). In the present embodiment, the converted signal generator 160 cooperates with the RGB converter 116 to determine the luminance of the pixel 200 in response to the mode signals from the emission mode selector 150. Therefore, the converted signal generator 160 and the RGB converter 116 are exemplified as the luminance determining portion.

(Emission Mode)

Figure 14A:
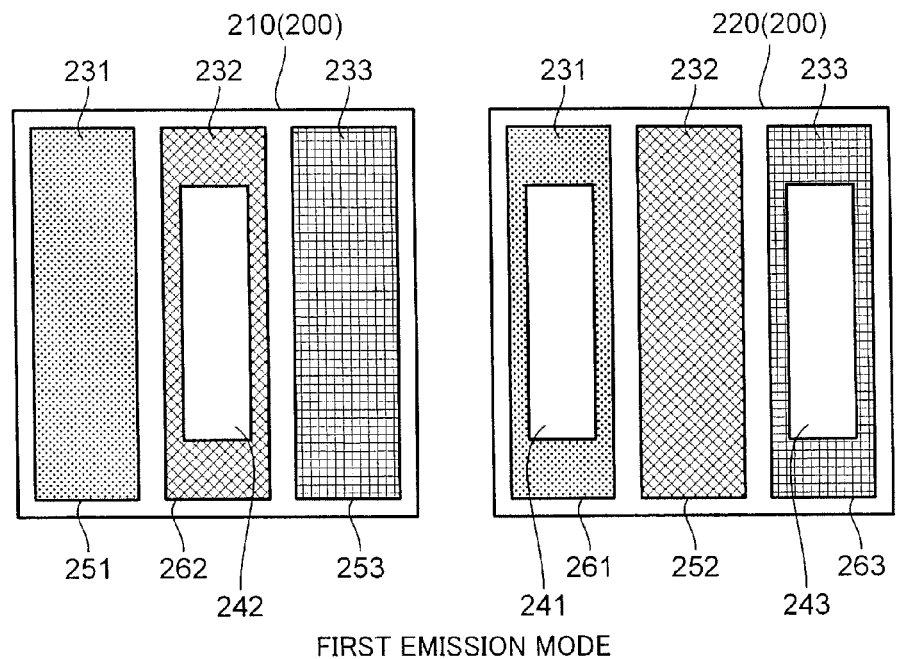
FIG. 14A is a schematic view showing first and second pixels under a first emission mode of the liquid crystal display device shown in FIG. 13.
Figure 14B:
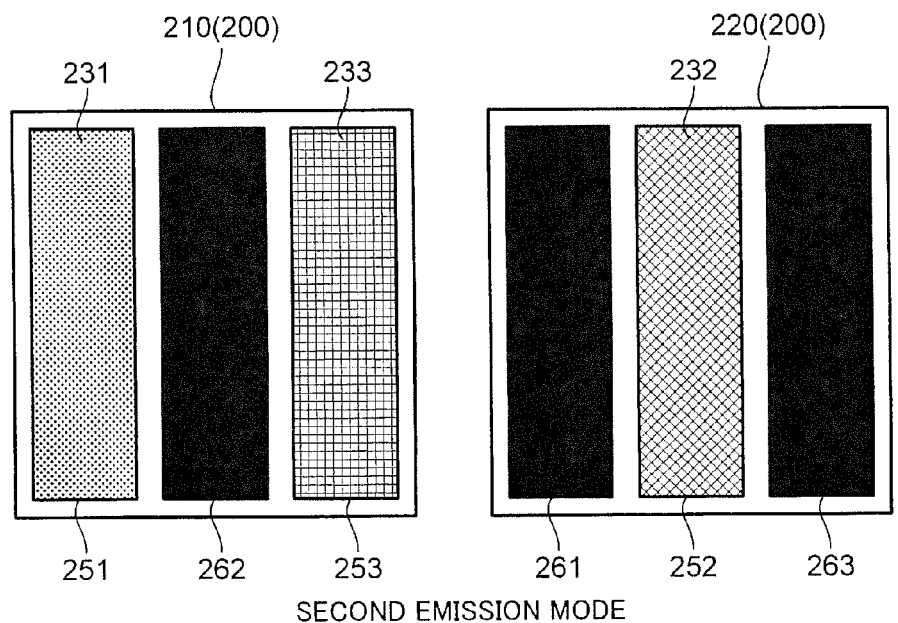
FIG. 14B is a schematic view showing the first and second pixels under a second emission mode of the liquid crystal display device shown in FIG. 13.

FIG. 14A is a schematic view showing the first and second pixels 210, 220 under the first emission mode. FIG. 14B is a schematic view showing the first and second pixels 210, 220 under the second emission mode. The emission modes of the pixels 200 are described with reference to FIGS. 13 to 14B.

The emission mode selector 150 set in the first emission mode outputs the first mode signal to the converted signal generator 160 to allow light emission from the unopened R, G and B sub-pixels 251, 252, 253 and opened R, G and B sub-pixels 261, 262, 263. Therefore, the display device 100A performs the same display operation under the first emission mode as the display device 100 described in the context of the first embodiment.

The emission mode selector 150 set in the second emission mode outputs the second mode signal to the converted signal generator 160 to allow light emission from the unopened R, G and B sub-pixels 251, 252, 253 without allowing light emission from the opened R, G and B sub-pixels 261, 262, 263. In the present embodiment, the emission mode selector 150 is exemplified as the emission selector.

The first and second converted signal generators 117A, 118A generate and output the drive signals under the first emission mode by means of similar algorithms to those used by the first and second converted signal generators 117, 118 described in the context of the first embodiment. The first and second converted signal generators 117A, 118A generate the drive signals under the second emission mode by means of different algorithms from those used in the first emission mode. For example, if the first and second converted signal generators 117A, 118A generate the drive signals in accordance with a matrix method, a conversion parameter in the matrix may be different between the first and second emission modes. If the first and second converted signal generators 117A, 118A generate the drive signals in accordance with a table method, the first and second converted signal generators 117A, 118A may utilize different conversion tables between the first and second emission modes to generate the drive signals.

In the second emission mode, the drive signals "ROD", "GOD", "BOD" are set so that luminance of all the opened R, G and B sub-pixels 261, 262, 263 becomes "0". The drive signals "RCD", "GCD", "BCD" may be set with taking account of no light emission from the opened R, G and B sub-pixels 261, 262, 263.

In the first emission mode, the opened R, G and B sub-pixels 261, 262, 263 emit light in response to video signals. Therefore, a video on the display surface 121 is brighter than that displayed under the second emission mode. In the second emission mode, the opened R, G and B sub-pixels 261, 262, 263 fail to emit light, so that a video on the display surface 121 is rendered only by the unopened R, G and B sub-pixels 251, 252, 253 which emit light of hues defined by video signals. Therefore, a video is displayed with higher color reproducibility under the second emission mode than the first emission mode.

Third Embodiment

Figure 15:
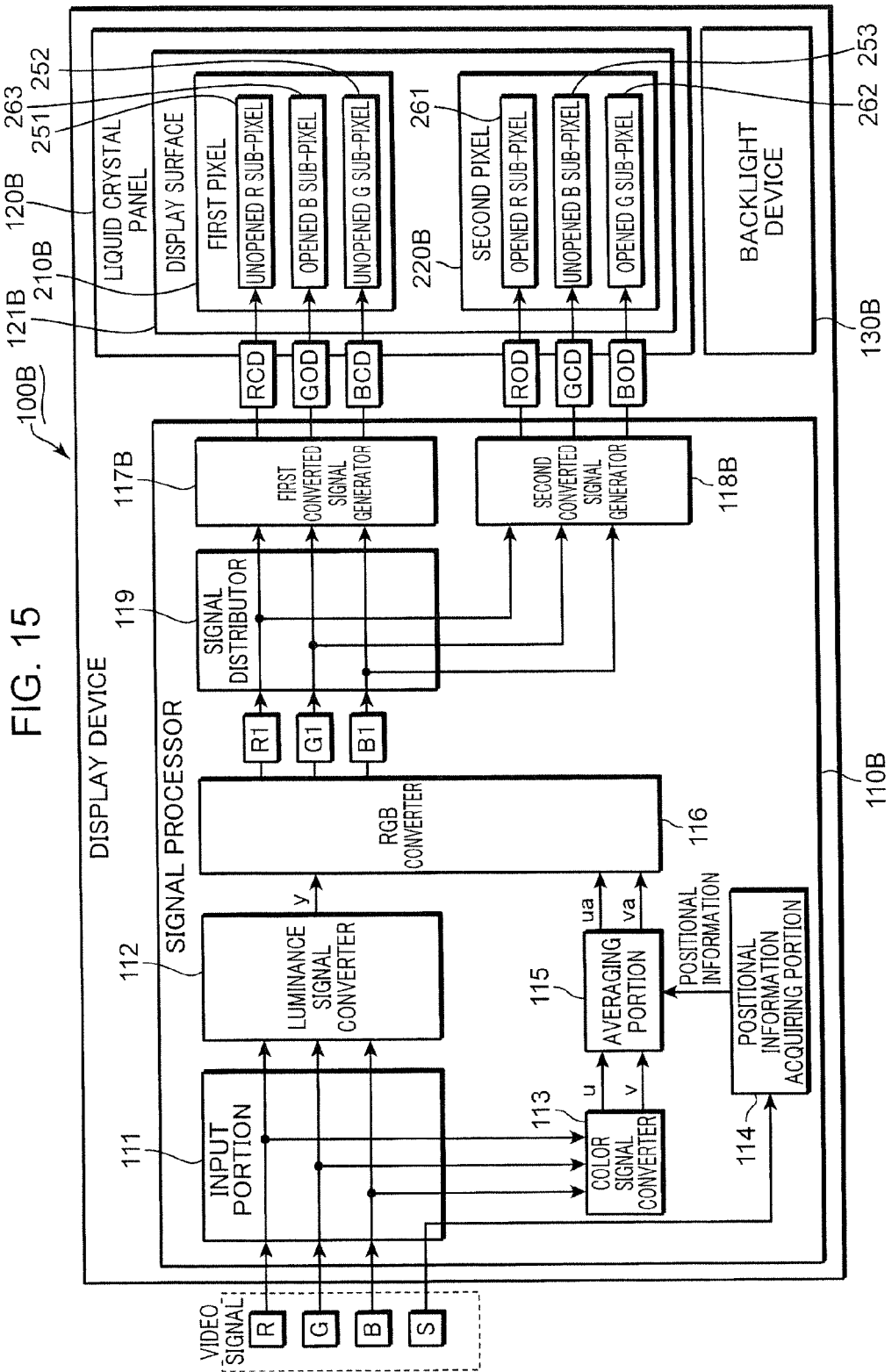
FIG. 15 is a schematic block diagram showing a liquid crystal display device according to the third embodiment.

FIG. 15 is a schematic block diagram showing the display device 100B according to the third embodiment. In FIG. 15, similar reference numbers are allocated to similar elements to elements of the display device 100 described in the context of the first embodiment. The description in the first embodiment may be applied to these elements.

The display device 100B includes a signal processor 110B, which processes video signals, and a liquid crystal panel 120B, which is driven by drive signals output from the signal processor 110B. Like the signal processor 110 described in the context of the first embodiment, the signal processor 110B includes the input portion 111, luminance signal converter 112, color signal converter 113, positional information acquiring portion 114, averaging portion 115, RGB converter 116, and signal distributor 119. The liquid crystal panel 120B includes a display surface 121B configured to display a video in response to video signals. The display surface 121B includes first pixels 210B and second pixels 220B which are arranged in a matrix.

Unlike the first pixels 210 described in the context of the first embodiment, the first pixel 210B includes the unopened R sub-pixel 251, opened B sub-pixel 263 and unopened G sub-pixel 252. The signal processor 110B further includes a first converted signal generator 117B configured to output drive signals associated with the first pixels 210B in response to the video signals ("R1", "G1", "B1") output from the RGB converter 116. The first converted signal generator 117B outputs to the liquid crystal panel 120B the drive signal "RCD" for driving the unopened R sub-pixel 251, drive signal "BOD" for driving the opened B sub-pixel 263 and drive signal "GCD" for driving the unopened G sub-pixel 252.

Unlike the second pixels 220 described in the context of the first embodiment, the second pixel 220B includes the opened R sub-pixel 261, unopened B sub-pixel 253, and opened G sub-pixel 262. The signal processor 110B further includes a second converted signal generator 118B configured to output drive signals associated with the second pixels 210B in response to the video signals ("R1", "G1", "B1") output from the RGB converter 116. The second converted signal generator 118B outputs to the liquid crystal panel 120B the drive signal "ROD" for driving the opened R sub-pixel 261, drive signal "BCD" for driving the unopened B sub-pixel 253 and drive signal "GOD" for driving the opened G sub-pixel 262.

Figure 16A:
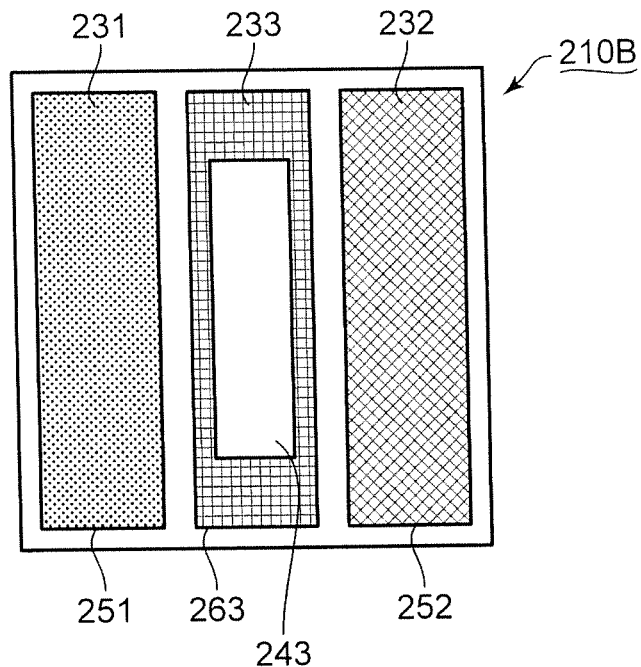
FIG. 16A is a schematic view showing a first pixel of the liquid crystal display device depicted in FIG. 15.
Figure 16B:
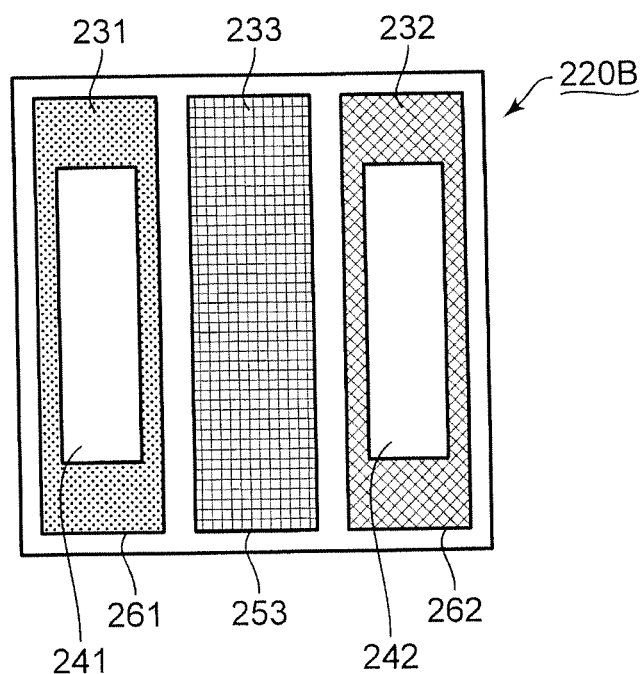
FIG. 16B is a schematic view showing a second pixel of the liquid crystal display device depicted in FIG. 15.

FIG. 16A is a schematic view of the first pixel 210B. FIG. 16B is a schematic view of the second pixel 220B. The display device 100B is described with reference to FIGS. 15 to 16B.

The display device 100B further includes a backlight device 130B configured to emit illumination light to the display surface 121B. As shown in FIGS. 16A and 16B, the second pixel 220B is formed with openings 241, 242 whereas the first pixel 210B is formed with only one opening 243. To reduce a luminance difference between the first and second pixels 210B, 220B, the backlight device 130B may emit illumination light which contains a larger amount of blue wavelength components. Alternatively, the opening 243 may be formed to have a larger size than the other openings 241, 242.

Figure 17:
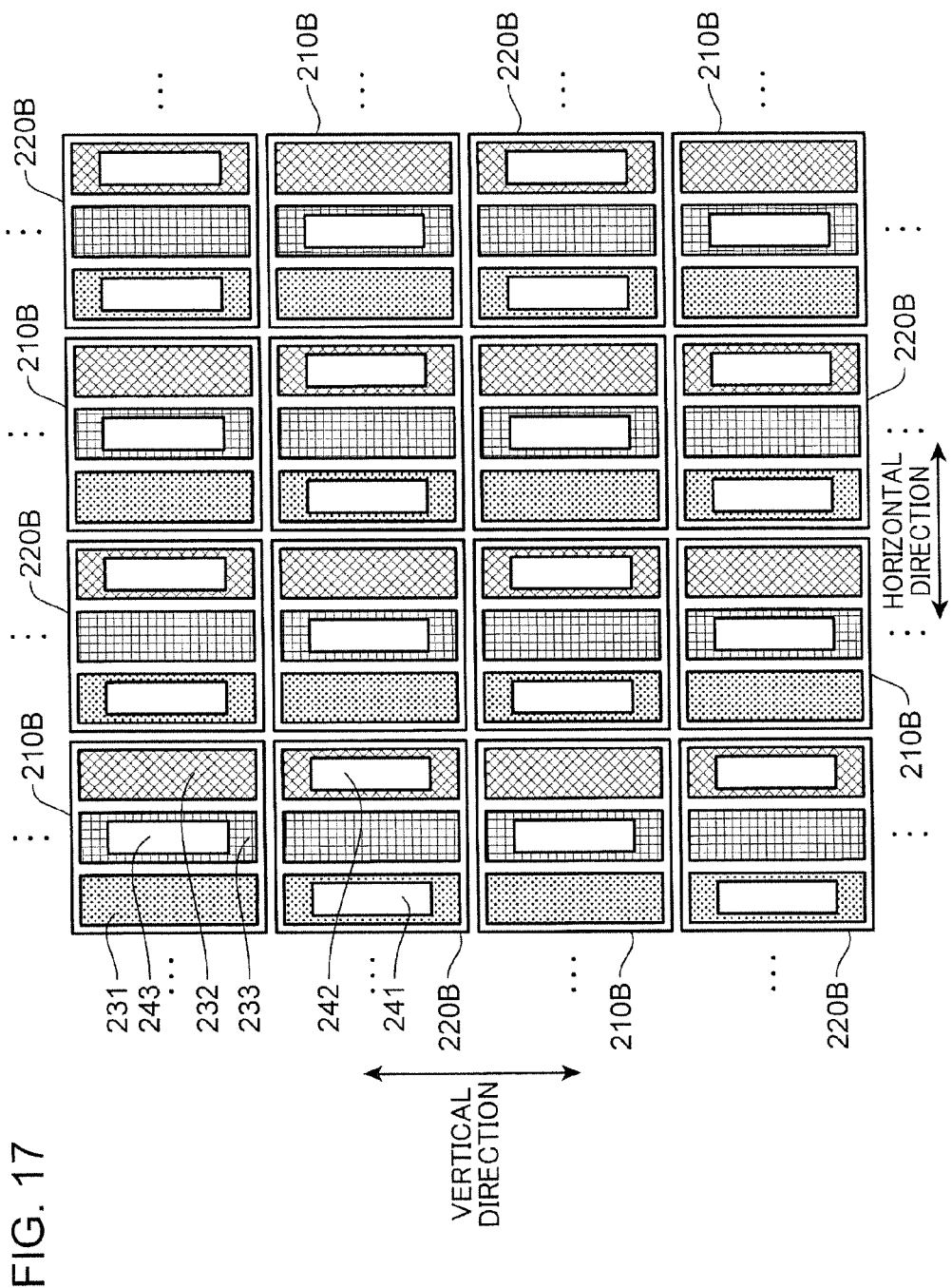
FIG. 17 is a schematic view showing an arrangement pattern of the first and second pixels depicted in FIGS. 16A and 16B.

FIG. 17 is a schematic view showing an arrangement pattern of the first and second pixels 210B, 220B. The arrangement pattern of the first and second pixels 210B, 220B is described with reference to FIG. 17.

As shown in FIG. 17, the first and second pixels 210B, 220B are arranged alternately in the horizontal and vertical directions to form a zigzag stitch pattern. In short, the first and second pixels 210B, 220B shown in FIG. 17 are arranged in accordance with the first arrangement pattern described in the context of the first embodiment. Alternatively, the first and second pixels 210B, 220B may be arranged in accordance with the second or third arrangement pattern described in the context of the first embodiment.

In the present embodiment, the first pixel 210B includes the unopened R sub-pixel 251, opened B sub-pixel 263 and unopened G sub-pixel 252. Alternatively, the first pixel may include the opened R sub-pixel 261, unopened B sub-pixel 253 and unopened G sub-pixel 252. In this case, the second pixel includes the unopened R sub-pixel 251, opened B sub-pixel 263 and opened G sub-pixel 262. The principle of the present embodiment is not limited to combinations of the sub-pixels included in the first and second pixels.

In the aforementioned series of the embodiments, the central sub-pixel of the first pixel is formed with an opening whereas there is no opening in the other sub-pixels. On the other hand, the sub-pixels at the edges of the second pixel are formed with an opening whereas there is no opening in the central sub-pixel. Such an opening pattern and such an arrangement pattern of pixels preferably make the opened sub-pixels less influential. However, the principle of the present embodiment is not particularly limited to opening patterns in pixels.

In the aforementioned series of the embodiments, the sub-pixels in a pixel are aligned in the horizontal direction. However, the principle of the present embodiment is not particularly limited to an arrangement pattern of the sub-pixels in pixels. Opening patterns in pixels may be determined in accordance with an arrangement pattern of sub-pixels in a pixel so as to appropriately distribute openings in a pixel region.

Fourth Embodiment

Display Device

Figure 18:
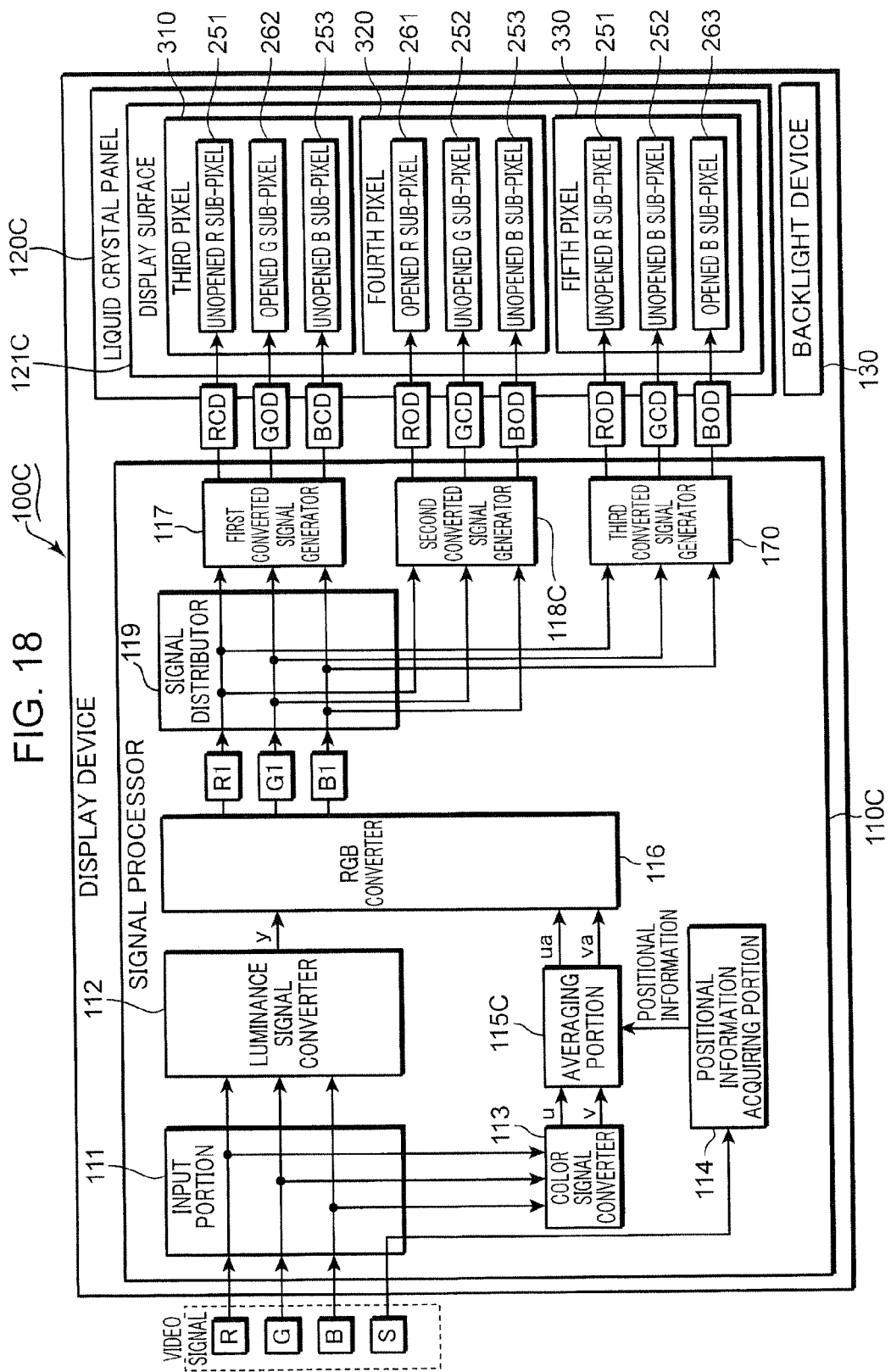
FIG. 18 is a schematic block diagram showing a liquid crystal display device according to the fourth embodiment.

FIG. 18 is a schematic block diagram showing the display device 100C according to the fourth embodiment. In FIG. 18, similar reference numbers are allocated to similar elements to elements of the display device 100 described in the context of the first embodiment. The description of the first embodiment is applicable to these elements.

Like the display device 100 described in the context of the first embodiment, the display device 100C includes the backlight device 130. The display device 100C further includes a signal processor 110C, which processes video signals, and a liquid crystal panel 120C, which is driven by drive signals output from the signal processor 110C.

Like the signal processor 110 described in the context of the first embodiment, the signal processor 110C includes the input portion 111, luminance signal converter 112, color signal converter 113, positional information acquiring portion 114, RGB converter 116, and first converted signal generator 117. The liquid crystal panel 120C includes a display surface 121C configured to display a video in response to video signals.

The display surface 121C includes third pixels 310. The third pixels 310 have the same combination and arrangement of sub-pixels as the first pixels 210 described in the context of the first embodiment. The display surface 121C further includes fourth and fifth pixels 320, 330 arranged in a matrix together with the third pixels 310. In the present embodiment, a set of the third to fifth pixels 310, 320, 330 is exemplified as the pixel set.

The fourth pixel 320 includes the opened R sub-pixel 261, unopened G sub-pixel 252 and unopened B sub-pixel 253. The fifth pixel 330 includes the unopened R sub-pixel 251, unopened G sub-pixel 252 and opened B sub-pixel 263.

In addition to the first converted signal generator 117 configured to output drive signals associated with the third pixels 310, the signal processor 110C further includes a second converted signal generator 118C configured to output drive signals associated with the fourth pixels 320 in response to the video signals ("R1", "G1", "B1") output from the RGB converter 116, and a third converted signal generator 170 configured to output drive signals associated with the fifth pixels 330 in response to the video signals ("R1", "G1", "B1") output from the RGB converter 116. The signal processor 110C further includes a signal distributor 119C configured to distribute the video signals ("R1", "G1", "B1") output from the RGB converter 116 to the first to third converted signal generators 117, 118C, 170.

Unlike the display device 100 described in the context of the first embodiment, the display device 100C displays a video by means of three types of pixels (third to fifth pixels 310, 320, 330). Therefore, the signal processor 110C further includes an averaging portion 115C configured to carry out averaging processes adapted to the three types of the pixels. The averaging processes carried out by the averaging portion 115C are described later.

(Pixels)

Figure 19:
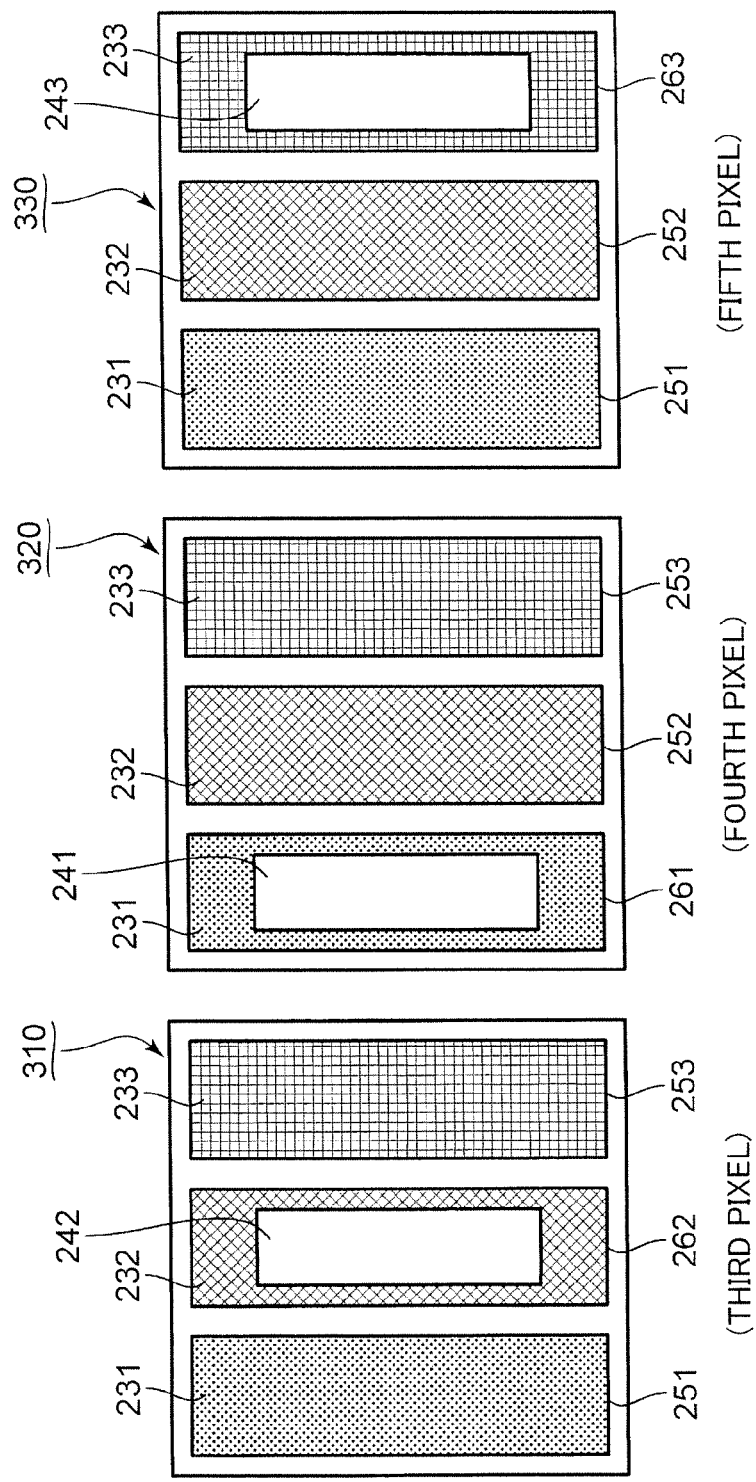
FIG. 19 is a schematic view showing first to third pixels of the liquid crystal display device depicted in FIG. 18.

FIG. 19 is a schematic view showing the third to fifth pixels 310, 320, 330. The third to fifth pixels 310, 320, 330 are described with reference to FIGS. 18 and 19.

The display device 100C includes the red color filter portion 231, which changes the white illumination light emitted from the backlight device 130 into a red hue, the green color filter portion 232, which changes the illumination light into a green hue, and the blue color filter portion 233, which changes the illumination light into a blue hue.

The third pixel 310 includes the opened G sub-pixel 262, which has the green color filter portion 232 formed with the opening 242, the unopened R sub-pixel 251, which has the red color filter portion 231, and unopened B sub-pixel 253, which has the blue color filter portion 233. In the present embodiment, the green color filter portion 232 is exemplified as the first color filter portion. The green hue is exemplified as the first hue. The opening 242 formed in the green color filter portion 232 is exemplified as the first opening. The green color filter portion 232 of the opened G sub-pixel 262 is exemplified as the first opened filter portion.

The fourth pixel 330 includes the opened R sub-pixel 261, which has the red color filter portion 231 formed with the opening 241, the unopened G sub-pixel 252, which has the green color filter portion 232, and the unopened B sub-pixel 253, which has the blue color filter portion 233. In the present embodiment, the red color filter portion 231 is exemplified as the second color filter portion. The red hue is exemplified as the second hue. The opening 241 formed in the red color filter portion 231 is exemplified as the second opening. The red color filter portion 231 of the opened R sub-pixel 261 is exemplified as the second opened filter portion.

The fifth pixel 330 includes the opened B sub-pixel 263, which has the blue color filter portion 233 formed with the opening 243, the unopened G sub-pixel 252, which has the green color filter portion 232, and the unopened R sub-pixel 251, which has the red color filter portion 231. In the present embodiment, the blue color filter portion 233 is exemplified as the third color filter portion. The blue hue is exemplified as the third hue. The opening 243 formed in the blue color filter portion 233 is exemplified as the third opening. The blue color filter portion 233 of the opened B sub-pixel 263 is exemplified as the third opened filter portion.

Like the aforementioned first to third embodiments, three sub-pixels are formed with the color filter portions (i.e., the red, green and blue color filter portions 231, 232, 233) which are different in hue from each other. Each of the third to fifth pixels 310, 320, 330 includes three sub-pixels. The third to fifth pixels 310, 320, 330 are arranged in a matrix to form the display surface 121C.

In the present embodiment, the unopened R sub-pixel 251 is exemplified as the first unopened sub-pixel. The unopened G sub-pixel 252 is exemplified as the second unopened sub-pixel. The unopened B sub-pixel 253 is exemplified as the third unopened sub-pixel.

Each size of the openings 241, 242, 243 are set so that the third to fifth pixels 310, 320, 330 emit light at equal luminance if the video signal input to the input portion 111 defines equal luminance for the third to fifth pixels 310, 320, 330. Therefore, the openings 241, 242, 243 may be different in size from each other.

As described below, in the present embodiment, each of the pixel sets forming the display surface 121C includes the third to fifth pixels 310, 320, 330. As described above, one opening (241, 242 or 243) is formed in a color filter portion every hue (i.e., the red, green and blue color filter portions 231, 232, 233) in the pixel set consisting of the third to fifth pixels 310, 320, 330.

(Arrangement Pattern of Pixels)

Figure 20:
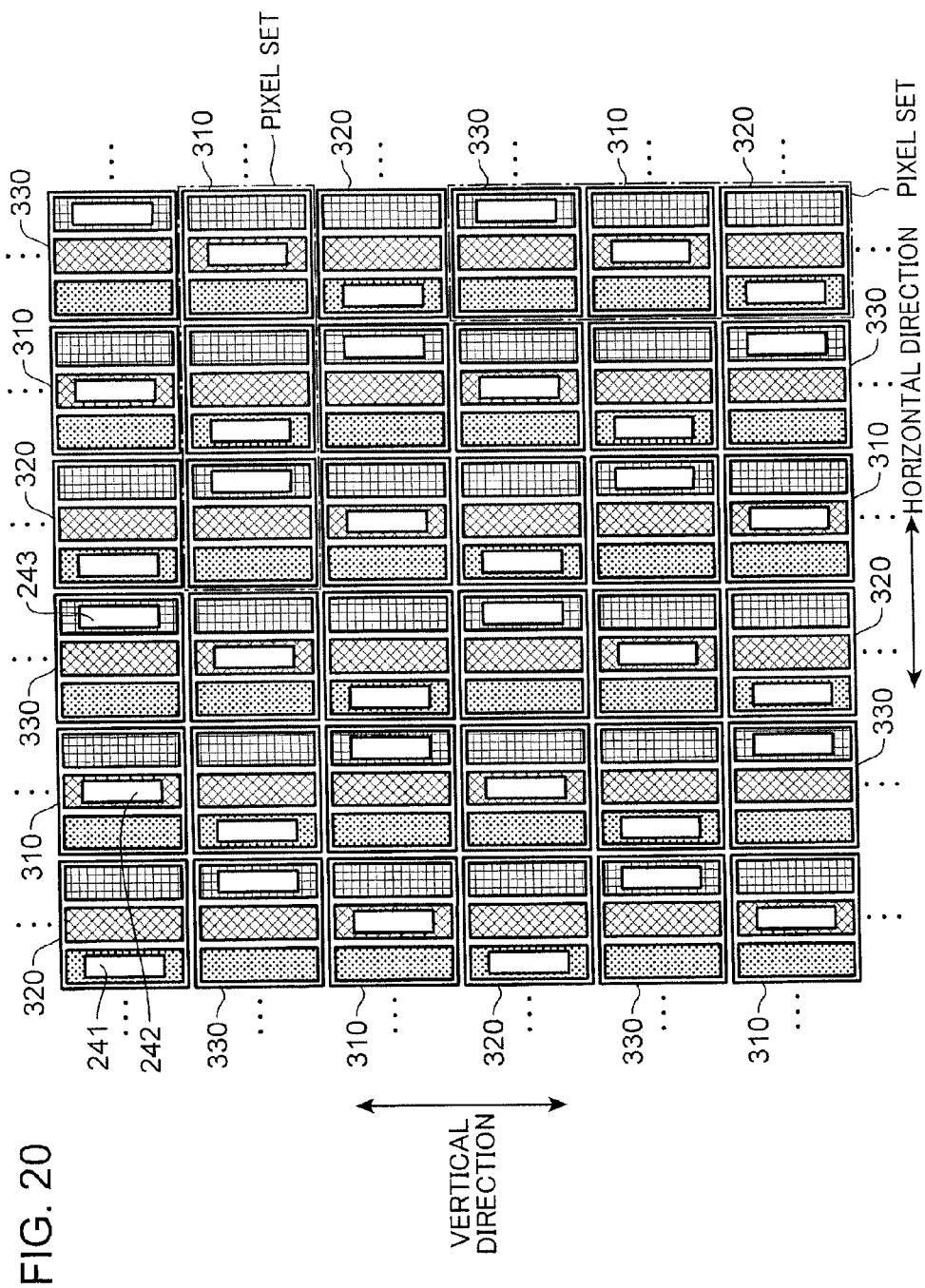
FIG. 20 is a schematic view showing an arrangement pattern of the first to third pixels shown in FIG. 19.

FIG. 20 is a schematic view showing an arrangement pattern of the third to fifth pixels 310, 320, 330. The arrangement pattern of third to fifth pixels 310, 320, 330 is described with reference to FIGS. 18 and 20.

It is preferable that the third to fifth pixels 310, 320, 330 are arranged with a substantially constant density over the display surface 121C. In the present embodiment, pixel lines, each of which consists of the third to fifth pixels 310, 320, 330, are repeatedly aligned in the horizontal and vertical directions. It is preferable that a pixel line consisting of the third to fifth pixels 310, 320, 330 in the horizontal and/or vertical directions is different in phase from the next pixel line. Consequently, the openings 241, 242, 243 are uniformly distributed, which results in little degradation in color resolution.

In the present embodiment, the third to fifth pixels 310, 320, 330 situated adjacently to each other in the horizontal direction may be defined as the pixel set. Alternatively, the third to fifth pixels 310, 320, 330 situated adjacently to each other in the vertical direction may be defined as the pixel set. A pixel set may be defined by the third to fifth pixels 310, 320, 330 situated adjacently to each other in one of the horizontal and vertical directions.

(Averaging Process)

The averaging process carried out by the averaging portion 115C is described with reference to FIG. 18.

Like the first embodiment, the video signal defines emission colors and luminance of the third to fifth pixels 310, 320, 330 by means of the red, green and blue hues. The color signal converter 113 outputs to the averaging portion 115C the signal "u", which indicates a difference between the luminance signal "y" and the blue color component, and the signal "v", which indicates a difference between the luminance signal "y" and the red color component, in response to the video signal. The positional information acquiring portion 114 outputs positional information to the averaging portion 115C.

Figure 21A:
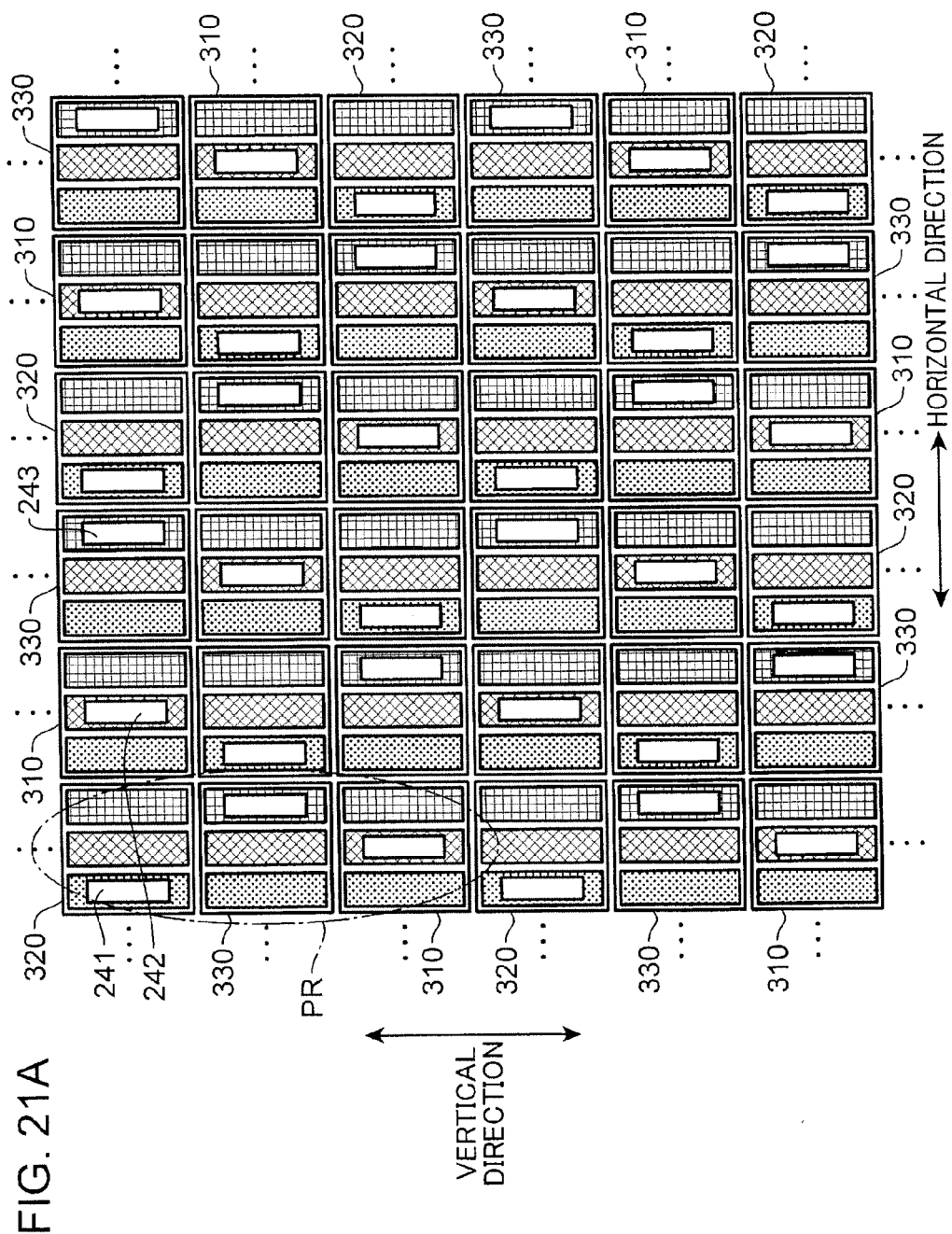
FIG. 21A is a conceptual view showing averaging processes carried out by an averaging portion of the liquid crystal display device depicted in FIG. 19.
Figure 21C:
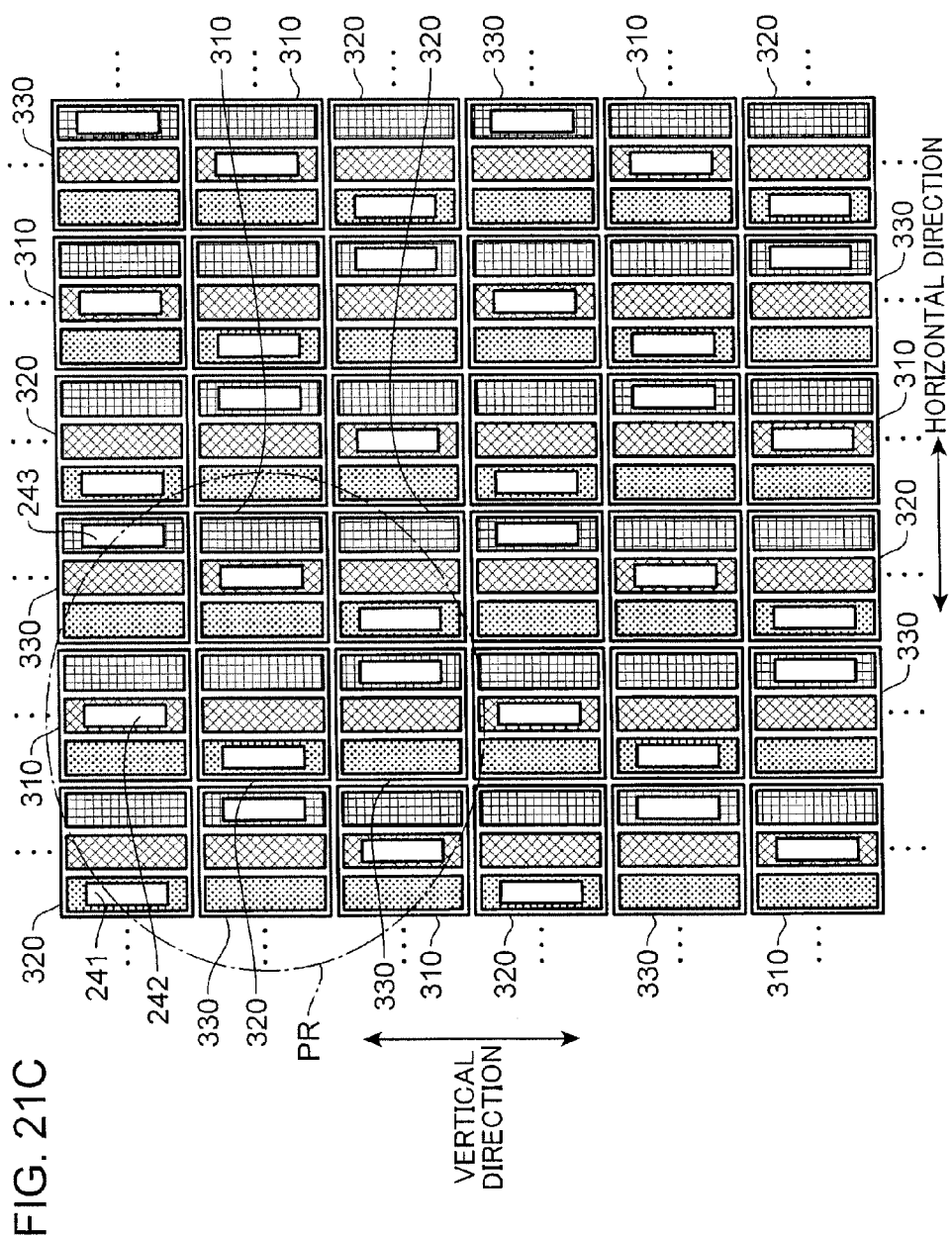
FIG. 21C is a conceptual view showing averaging processes carried out by the averaging portion of the liquid crystal display device depicted in FIG. 19.

FIGS. 21A to 21C are conceptual views showing the averaging process carried out by the averaging portion 115C. The averaging process is described with reference to FIGS. 9, 18, 21A to 21C.

In FIG. 21A, the averaging portion 115C sets the pixel region PR to include the third to fifth pixels 310, 320, 330 which are aligned in the vertical direction. In FIG. 21B, the averaging portion 115C sets the pixel region PR to include the third to fifth pixels 310, 320, 330 which are aligned in the horizontal direction. In FIG. 21C, the averaging portion 115C sets the pixel region PR to include three third pixels 310, three fourth pixels 320 and three fifth pixels 330 which are aligned in the horizontal and vertical directions. The averaging process shown in FIG. 21C is executed in the horizontal and vertical directions evenly to cause little noticeable unbalance in color resolution between the vertical and horizontal directions.

The averaging portion 115C may average the emission colors assigned to the third to fifth pixels 310, 320, 330 in the pixel region PR in accordance with the process described with reference to FIG. 9 and output the averaged color signals. The RGB converter 116 and the first to third converted signal generators 117, 118C, 170 output drive signals, which determine emission luminance of the third to fifth pixels 310, 320, 330 in response to the luminance signals output from the luminance signal converter 112 and the averaged color signals output from the averaging portion 115C. The principle of the drive signal generation using the RGB converter 116 and the first to third converted signal generators 117, 118C, 170 may conform to the method described in the context of the first embodiment. In the present embodiment, the RGB converter 116 and the first to third converted signal generators 117, 118C, 170 are exemplified as the luminance determining portion.

Fifth Embodiment

Display Device

FIG. 22 is a schematic block diagram showing the display device 100D according to the fifth embodiment. In FIG. 22, similar reference numbers are allocated to similar elements to elements of the display device 100 described in the context of the first embodiment. The description of the first embodiment is applicable to these elements.

Like the display device 100 described in the context of the first embodiment, the display device 100D includes the signal processor 110 and the backlight device 130. The display device 100D further includes a liquid crystal panel 120D provided with a display surface 121D, which is illuminated by the backlight device 130.

The display surface 121D includes pixels 200D arranged in a matrix. The pixels 200D are driven in response to the video signals processed by the signal processor 110 to modulate illumination light from the backlight device 130. Consequently, a video defined by the video signals is displayed on the display surface 121D. Like the display device 100 described in the context of the first embodiment, the display device 100D displays a video by means of two types of the pixels 200D.

(Pixels)

FIG. 23 is a schematic view showing a first pixel 210D and a second pixel 220D which are used as the pixels 200D. The pixels 200D are described with reference to FIGS. 3A, 3B, 22 and 23.

Like the display device 100 described in the context of the first embodiment, the display device 100D includes the red, green and blue color filter portions 231, 232, 233. The display device 100D further includes a pink color filter portion 231D for emitting light in pink, which is lower in saturation than red light emitted through the red color filter portion 231, a light green color filter portion 232D for emitting light in light green, which is lower in saturation than green light emitted through the green color filter portion 232, and a light blue color filter portion 233D for emitting light in light blue which is lower in saturation than blue light emitted through the blue color filter portion 233.

Light passed through the pink color filter portion 231D has a emission color equivalent to that of the opened R sub-pixel 261 described with reference to FIG. 3B. Light passed through the light green color filter portion 232D has an emission color equivalent to that of the opened G sub-pixel 262 described with reference to FIG. 3A. Light passed through the light blue color filter portion 233D has an emission color equivalent to that of the opened B sub-pixel 263 described with reference to FIG. 3B.

The first pixel 210D includes a light green sub-pixel 262D with the light green color filter portion 232D, the unopened R sub-pixel 251, and the unopened B sub-pixel 253. Unlike the first pixel 210 described in the context of the first embodiment, there is no opening in the light green color filter portion 232D of the first pixel 210D.

The second pixel 220D includes a pink sub-pixel 261D with the pink color filter portion 231D, a light blue sub-pixel 263D with the light blue color filter portion 233D, and the unopened G sub-pixel 252. Unlike the second pixel 220 described in the context of the first embodiment, there is no opening in each of the pink color filter portion 231D and the light blue color filter portion 233D of the second pixel 220D.

Figure 24:
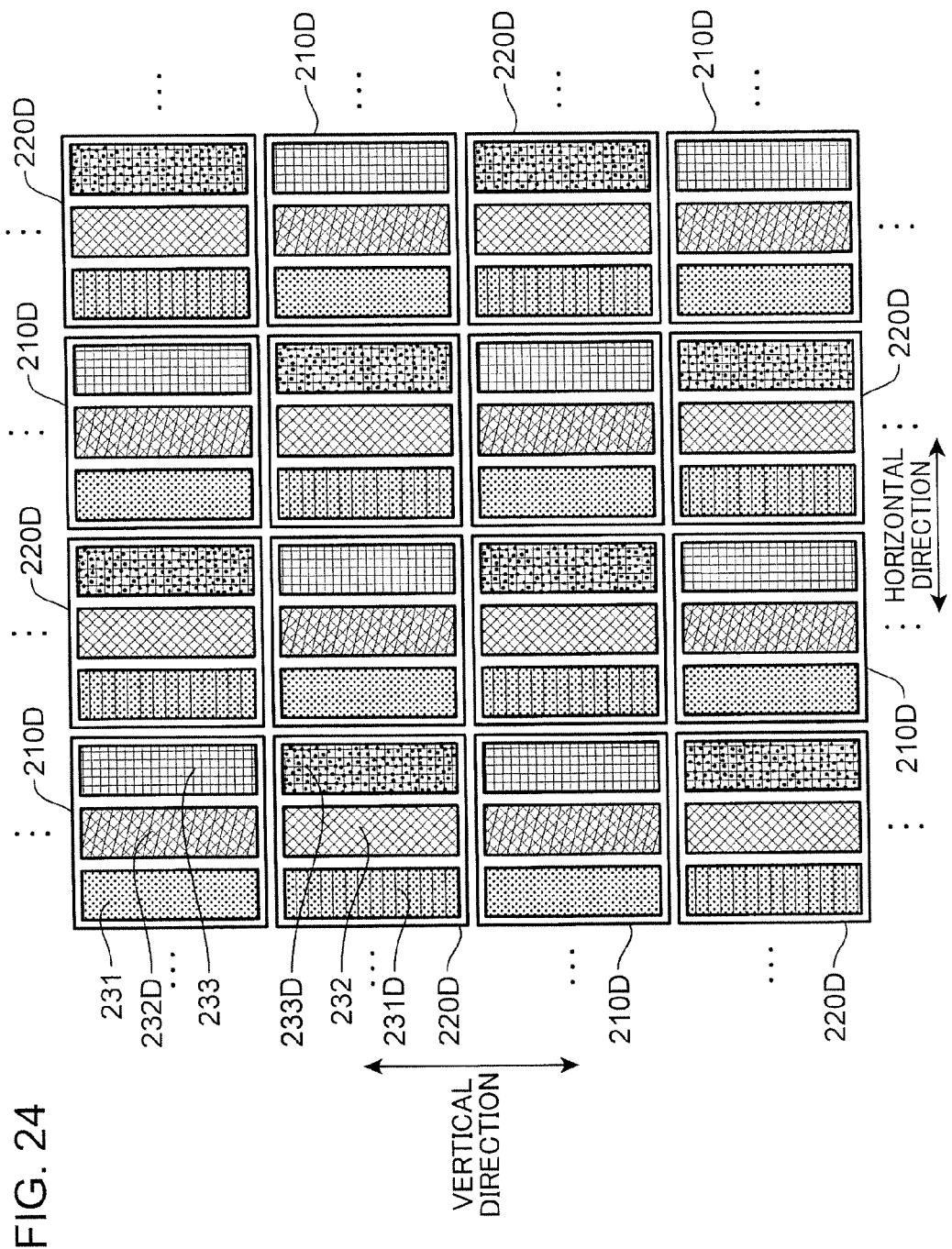
FIG. 24 is a schematic view showing an arrangement pattern of the first and second pixels depicted in FIG. 23.

FIG. 24 is a schematic view showing an arrangement pattern of the first and second pixels 210D, 220D. The arrangement pattern of the first and second pixels 210D, 220D is described with reference to FIG. 24.

As shown in FIG. 24, the first and second pixels 210D, 220D are arranged alternately in the horizontal and vertical directions to form a zigzag stitch pattern. In short, the first and second pixels 210D, 220D are arranged according to the first arrangement pattern described in the context of the first embodiment. Alternatively, the first and second pixels 210D, 220D may be arranged according to the second or third arrangement pattern described in the context of the first embodiment.

The display device according to the principle of the present embodiment displays a video on the display surface including pixels (the first and second pixels 210D, 220D), each of which includes three sub-pixels to emit different lights in hues (i.e., a set of light green sub-pixel 262D, unopened R sub-pixel 251 and unopened B sub-pixel 253 or a set of pink sub-pixel 261D, light blue sub-pixel 263D and unopened G sub-pixel 252) are arranged in a matrix. The display device includes: the backlight device configured to emit illumination light toward the display surface; the first color filter portion (red, green or blue color filter portion 231, 232, 233) for changing a hue of the illumination light into the first hue (red, green or blue); the second color filter portion (red, green or blue color filter portion 231, 232, 233) for changing the hue of the illumination light into the second hue (pink, light green or light blue) which is different from the first hue; a first low saturation color filter portion (pink color filter portion 231D, light green color filter portion 232D or light blue color filter portion 233D) for changing the illumination light into a first low saturation light (light of pink, light green or light blue) which is lower in saturation than first light (light of red, green or blue) emitted through the first color filter portion; and a second low saturation color filter portion (pink color filter portion 231D, light green color filter portion 232D or light blue color filter portion 233D) for changing the illumination light into second low saturation light (light of pink, light green or light blue) which is lower in saturation than second light emitted through the second color filter portion, wherein the pixels include the first pixel having the first color filter portion and the second low saturation color filter portion, and the second pixel having the second color filter portion and the first low saturation color filter portion.

Sixth Embodiment

Display Device

Figure 25:
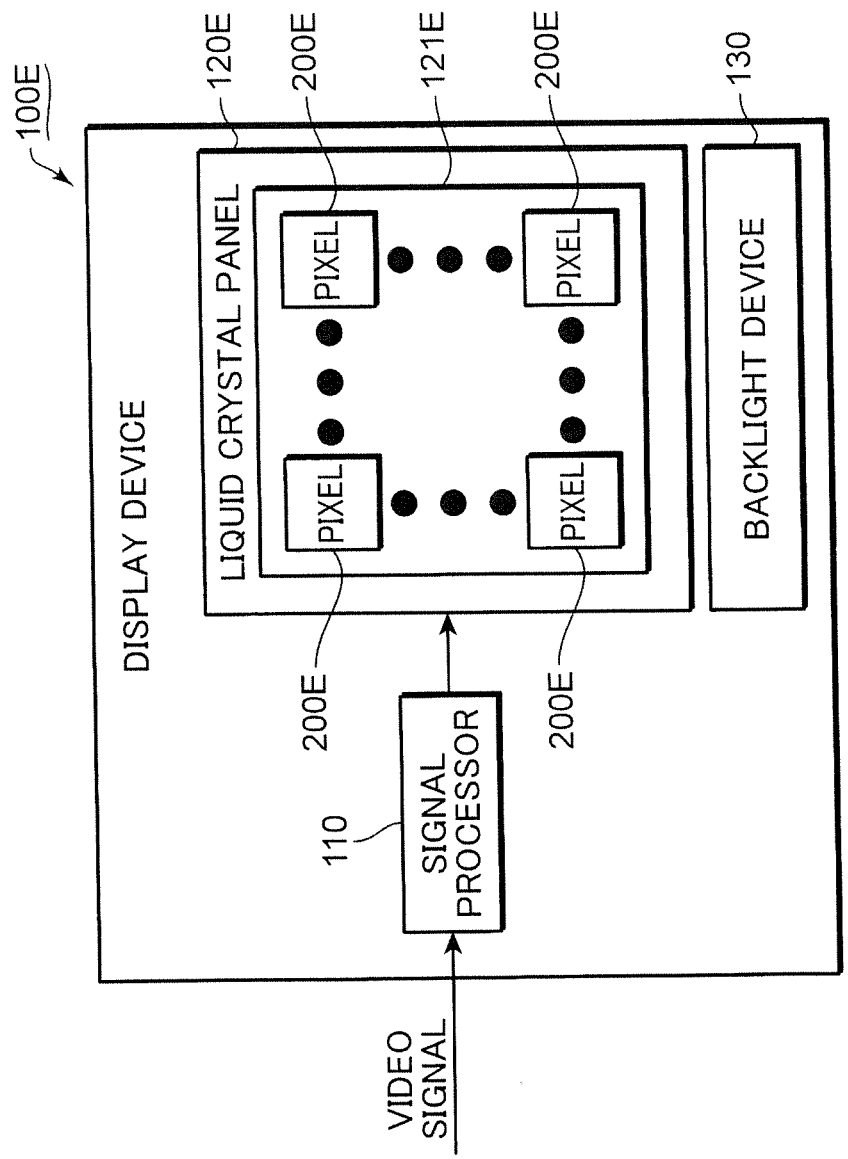
FIG. 25 is a schematic block diagram showing a liquid crystal display device according to the sixth embodiment.

FIG. 25 is a schematic block diagram showing a display device 100E according to the sixth embodiment. In FIG. 25, similar reference numbers are allocated to similar elements to elements of the display device 100 described in the context of the first embodiment. The description of the first embodiment is applicable to these elements.

Like the display device 100 described in the context of the first embodiment, the display device 100E includes the signal processor 110 and the backlight device 130. The display device 100E further includes a liquid crystal panel 120E provided with a display surface 121E, which is illuminated by the backlight device 130.

The display surface 121D includes pixels 200E arranged in a matrix. The pixels 200E are driven in response to the video signal processed by the signal processor 110 to modulate illumination light from the backlight device 130. Consequently, a video defined by the video signal is displayed on the display surface 121E. Like the display device 100 described in the context of the first embodiment, the display device 100E displays a video by means of two types of the pixels 200E.

(Pixels)

Figure 26:
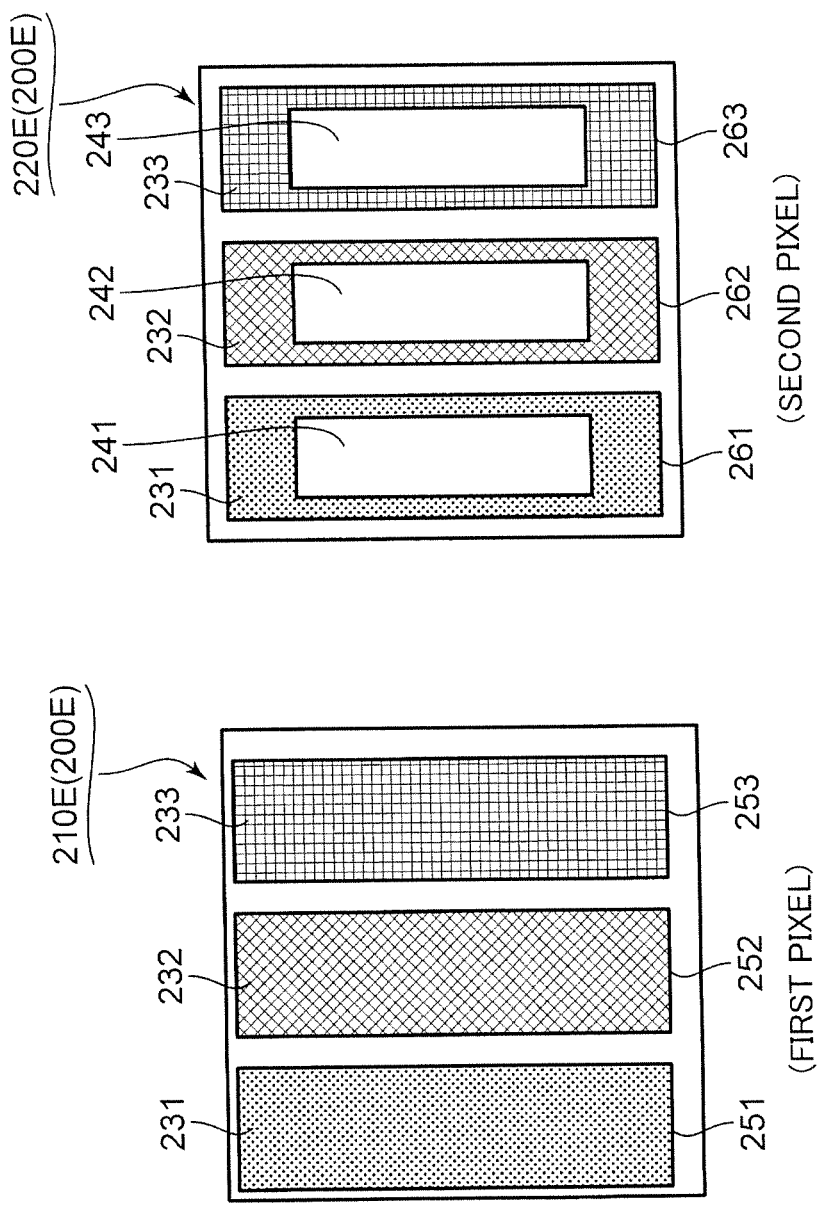
FIG. 26 is a schematic view showing first and second pixels used as pixels of the liquid crystal display device depicted in FIG. 25.

FIG. 26 is a schematic view showing a first pixel 210E and a second pixel 220E which are used as the pixels 200E. The pixels 200E are described with reference to FIGS. 25 and 26. In the present embodiment, the set of the first and second pixels 210E, 220E is exemplified as the pixel set.

The first pixel 210E includes the unopened R, G and B sub-pixels 251, 252, 253. The second pixel 220E includes the opened R, G and B sub-pixels 261, 262, 263.

Figure 27:
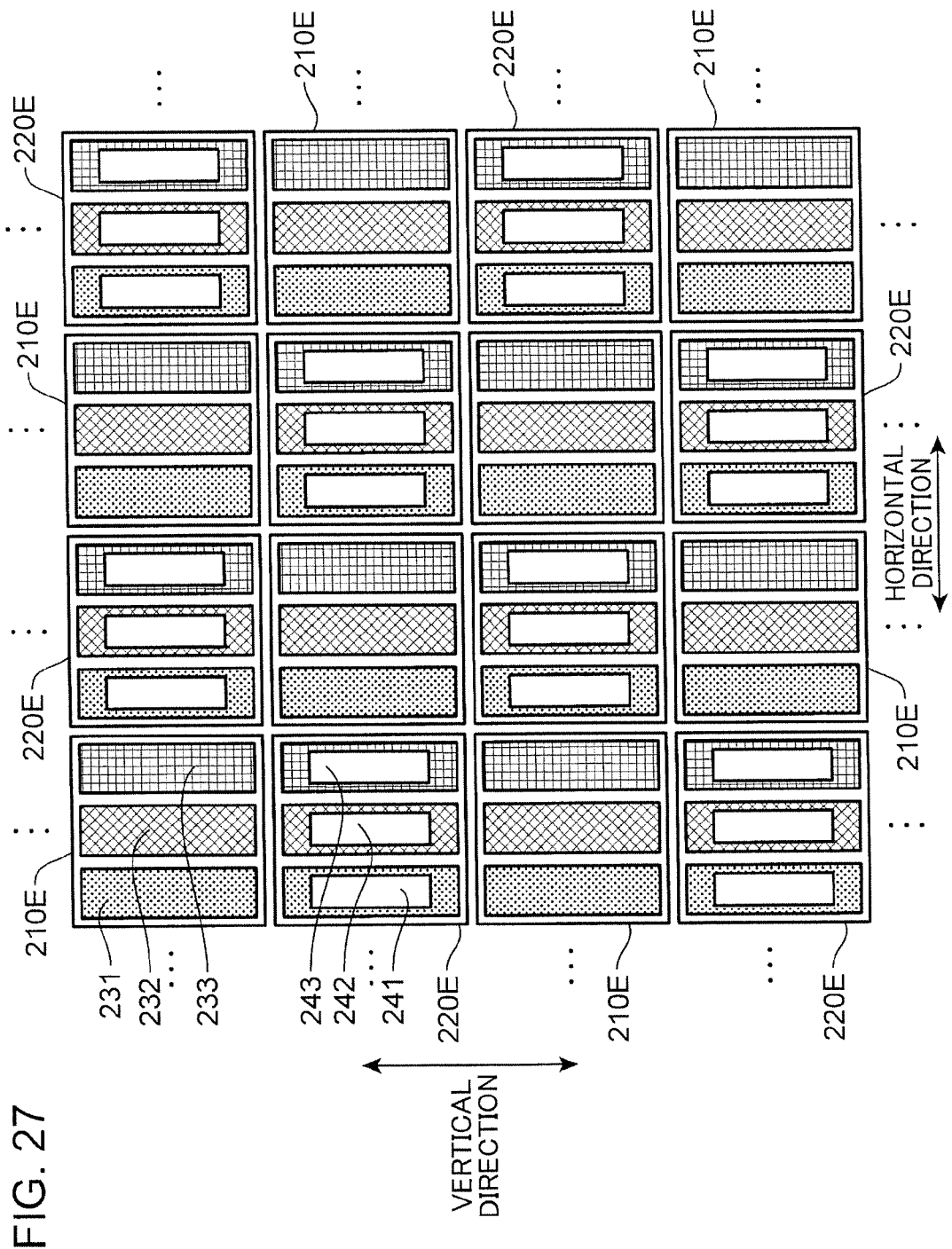
FIG. 27 is a schematic view showing an arrangement pattern of the first and second pixels depicted in FIG. 26.

FIG. 27 is a schematic view showing an arrangement pattern of the first and second pixels 210E, 220E. The arrangement pattern of the first and second pixels 210E, 220E is described with reference to FIGS. 25 and 27.

As shown in FIG. 27, the first and second pixels 210E, 220E are arranged alternately in the horizontal and vertical directions to form a zigzag stitch pattern. In short, the first and second pixels 210E, 220E are arranged according to the first arrangement pattern described in the context of the first embodiment.

In the present embodiment, there is no opening in the first pixel 210E whereas only the second pixel 220E is formed with openings 241, 242, 243. Therefore, the openings 241, 242, 243 of the display device 100E according to the present embodiment may be formed more easily than those of the display device 100 according to the first embodiment. As described above, the first and second pixels 210E, 220E are arranged according to the first arrangement pattern to distribute the openings 241, 242, 243 over the display surface 121E, which results in little degradation in color resolution.

Figure 28A:
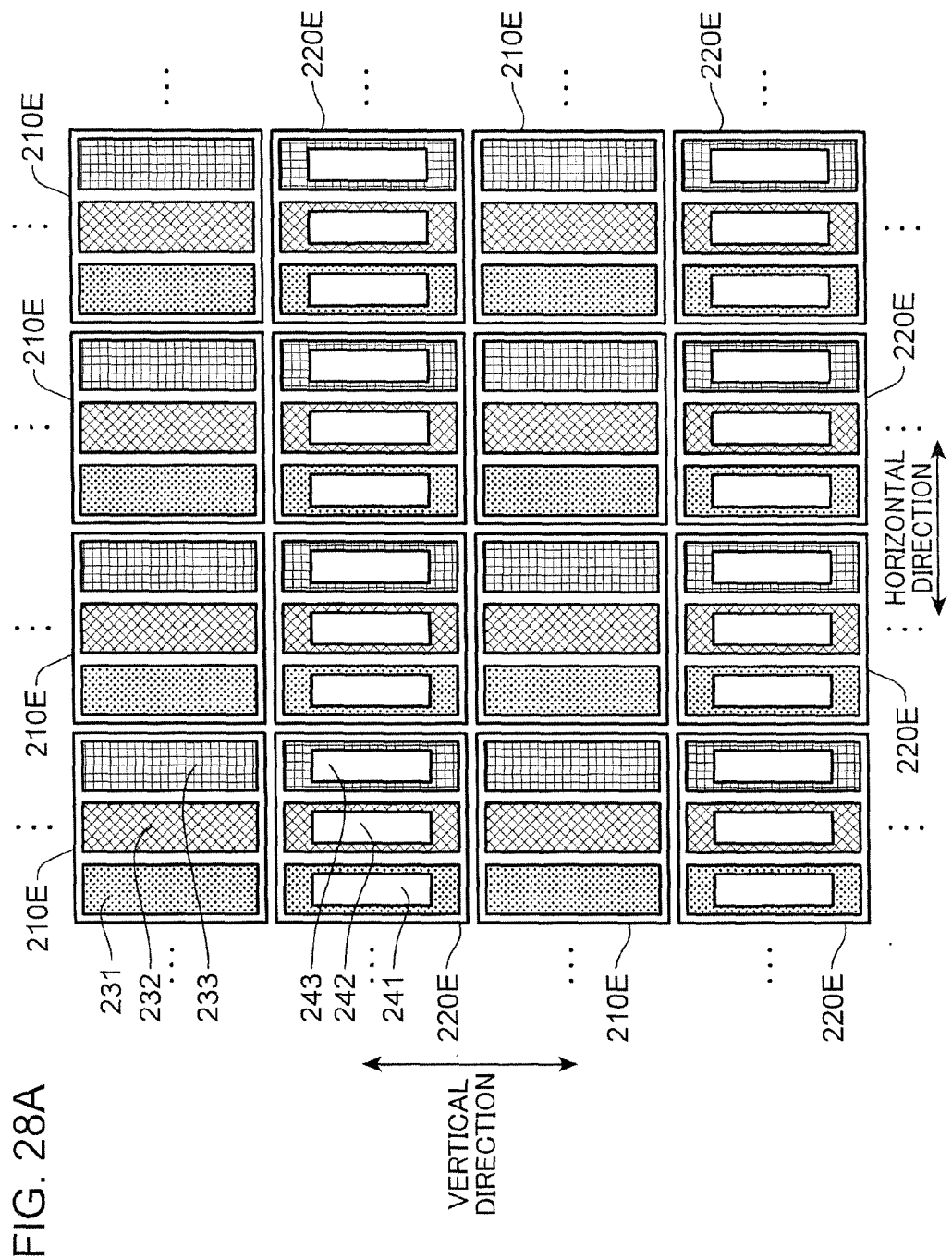
FIG. 28A is a schematic view showing another arrangement pattern of the first and second pixels depicted in FIG. 26.
Figure 28B:
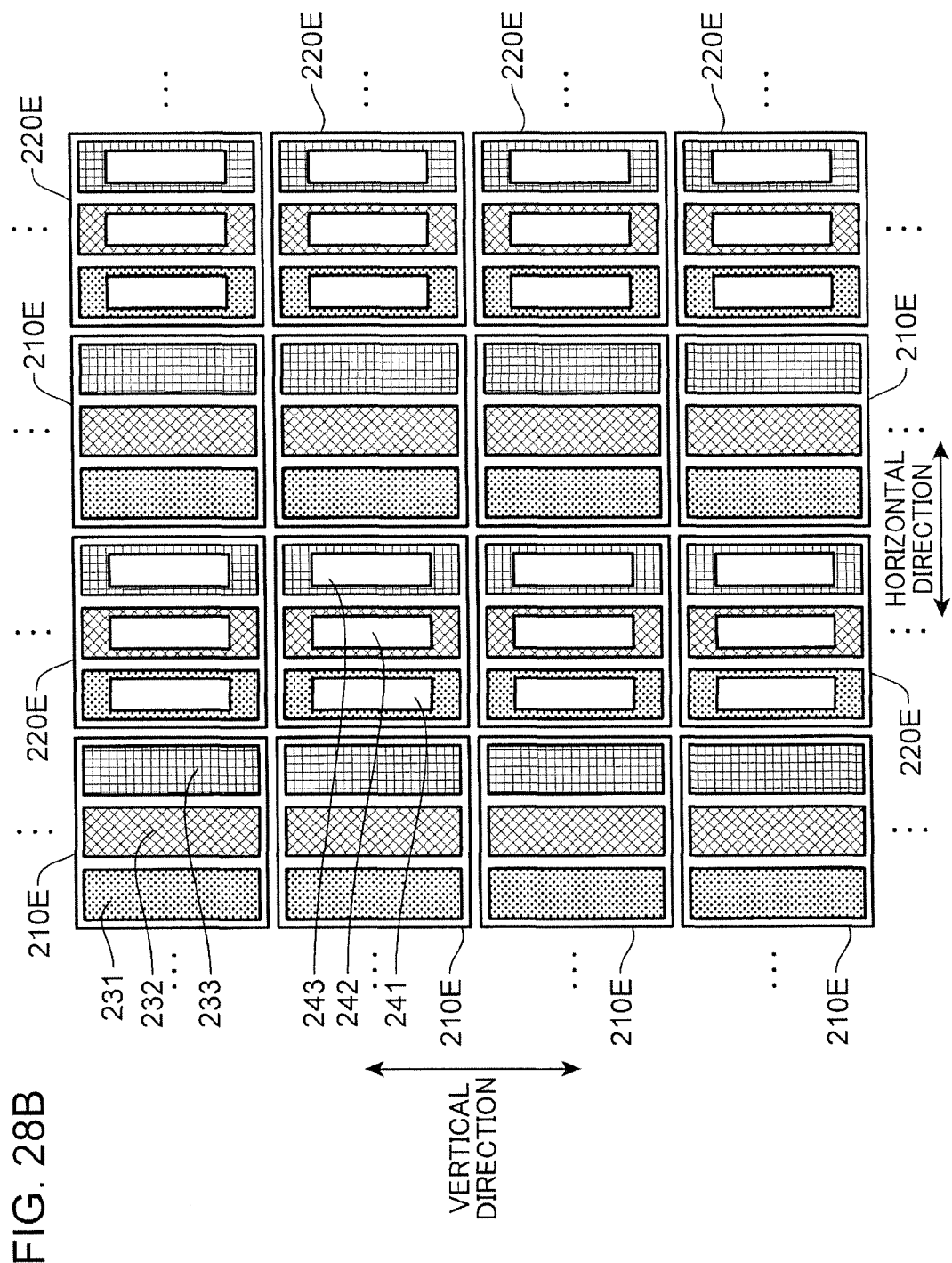
FIG. 28B is a schematic view showing another arrangement pattern of the first and second pixels depicted in FIG. 26.

FIGS. 28A and 28B are schematic views shows other arrangement patterns of the first and second pixels 210E, 220E. The other arrangement patterns of the first and second pixels 210E, 220E are described with reference to FIGS. 25, 28A and 28B.

The first and second pixels 210E, 220E shown in FIG. 28A are arranged according to the second arrangement pattern described in the context of the first embodiment. The first and second pixels 210E, 220E are arranged alternately in the vertical direction and aligned continuously in the horizontal direction.

The first and second pixels 210E, 220E shown in FIG. 28B are arranged according to the third arrangement pattern described in the context of the first embodiment. The first and second pixels 210E, 220E are arranged alternately in the horizontal direction and aligned continuously in the vertical direction.

If the first and second pixels 210E, 220E are arranged in the second or third arrangement pattern, sequences of openings 241, 242, 243 aligned in the horizontal or vertical direction are formed. Therefore, the openings 241, 242, 243 may be formed more easily than the first arrangement pattern described with reference to FIG. 27.

The specific embodiments described above mainly include a display device having the following features.

In one general aspect, the instant application describes a liquid crystal display device for displaying a video on a display surface with pixels arranged in a matrix, each of the pixels having three sub-pixels formed with different color filter portion in hue from each other. The display surface includes pixel sets defined so that each of the pixel sets includes two or three of the pixels adjacent to each other in at least one of a vertical direction and a horizontal direction; and an opening is formed on one of the color filter portions every hue in the pixel set.

According to the aforementioned configuration, since an opening is formed on one of the color filter portions in the pixel set every hue, the liquid crystal display device may display a very bright video. The liquid crystal display device may display the very bright video without a complicated design for pixels.

The above general aspect may include one or more of the following features. The liquid crystal display device may include the pixel set is defined to include the two pixels; and the two pixels in the pixel set include: a first pixel with a first opened sub-pixel including a first opened filter portion, which has a first color filter portion of a first hue formed with a first opening, a first unopened sub-pixel, which has a second color filter portion of a second hue, and a third unopened sub-pixel, which has a third color filter portion of a third hue; and a second pixel with a second opened sub-pixel including a second opened filter portion, which has the second color filter portion of the second hue formed with a second opening, a second unopened sub-pixel, which has the first color filter portion of the first hue, and a third opened sub-pixel, which has the third color filter portion of the third hue formed with a third opening.

According to the aforementioned configuration, the first pixel includes the first opened sub-pixel with the first opened filter portion, which has the first color filter portion of the first hue formed with the first opening, in addition to the first unopened sub-pixel with the second color filter portion of the second hue and the third unopened sub-pixel with the third color filter portion of the third hue. The second pixel includes the second opened sub-pixel with the second opened filter portion, which has the second color filter portion of the second hue formed with the second opening, and the third opened sub-pixel, which has the third color filter portion of the third hue formed with the third opening, in addition to the second unopened sub-pixel having the first color filter portion of the first hue. Therefore, the liquid crystal display device may display a very bright video. The liquid crystal display device may display the very bright video without a complicated design of pixels.

The liquid crystal display device may further include an input portion to which a video signal is input to display the video. Each size of the first to third openings is designed so that each of the first and second pixels emits light at equal luminance if the video signal defines equal luminance for the first and second pixels.

According to the aforementioned configuration, each size of the first to third openings is designed so that the first and second pixels emit light at equal luminance if the video signal input to the input portion defines equal luminance for the first and second pixels. Therefore, the liquid crystal display device may display a video with uniform luminance.

The first opened sub-pixel of the first pixel may be situated between the first and third unopened sub-pixels; and the second unopened sub-pixel of the second pixel may be situated between the second and third opened sub-pixels.

According to the aforementioned configuration, the opened and unopened sub-pixels are distributed in a pixel set. Therefore, the openings become less influential on a displayed video.

The first and second pixels may be arranged to form a zigzag stitch pattern on the display surface.

According to the aforementioned configuration, the first and second pixels are uniformly arranged over the display surface. Therefore, the liquid crystal display device may display a video with uniform luminance.

The first and second pixels may be arranged alternately in a horizontal direction.

According to the aforementioned configuration, the first and second pixels are arranged alternately in the horizontal direction. Therefore, the liquid crystal display device may display a video with uniform luminance in the horizontal direction.

The first and second pixels may be arranged alternately in a vertical direction.

According to the aforementioned configuration, the first and second pixels are arranged alternately in the vertical direction. Accordingly, the liquid crystal display device may display a video with uniform luminance in the vertical direction.

The first to third hues may be selected from a group consisting of red, green and blue, respectively. The video signal may define emission colors and luminance from the first and second pixels by means of the red, green and blue hues.

According to the aforementioned configuration, the liquid crystal display device may display a very bright color video without downsizing sub-pixels and increasing source driver pins, source lines and TFTs.

The liquid crystal display device may further include: an averaging portion which averages the emission colors assigned by the video signal in a pixel region including the first and second pixels to output an averaged color signal; and a luminance determining portion configured to determine luminance of light emitted from the first to third unopened sub-pixels and the first to third opened sub-pixels in response to the averaged color signal.

According to the aforementioned configuration, the averaging portion averages the emission colors assigned by the video signal in the pixel region including the first and second pixels to output the averaged color signal. The luminance determining portion determines luminance of light emitted from the first to third unopened sub-pixels and the first to third opened sub-pixels. Therefore, the liquid crystal display device may display a video appropriately in response to the video signal.

The liquid crystal display device may further include an emission selector configured to selectively determine whether or not the first to third opened sub-pixels emit light. The luminance determining portion may determine the luminance of the light emitted from the first to third unopened sub-pixels and the first to third opened sub-pixels in response to the averaged color signal and a determination made by the emission selector.

According to the aforementioned configuration, the liquid crystal display device allows selection whether or not to emit light from the first to third opened sub-pixels. Unless light is emitted from the first to third opened sub-pixels in response to the determination by the emission selector, a displayed video on the display surface may have high color reproducibility with low luminance. If light is emitted from the first to third opened sub-pixels in response to the determination by the emission selector, a display video on the display surface may have high luminance with low color reproducibility.

The pixel set may be defined to include the three pixels. The three pixels in the pixel set may include: a third pixel with a first opened sub-pixel including a first opened filter portion, which has a first color filter portion of a first hue formed with a first opening, a first unopened sub-pixel, which has a second color filter portion of a second hue, and a third unopened sub-pixel, which has a third color filter portion of a third hue; a fourth pixel with a second opened sub-pixel including a second opened filter portion, which has the second color filter portion of the second hue formed with a second opening, a second unopened sub-pixel, which has the first color filter portion of the first hue, and a third unopened sub-pixel, which has the third color filter portion of the third hue; and a fifth pixel with a third opened sub-pixel, which has the third color filter portion of the third hue formed with a third opening, a second unopened sub-pixel, which has the first color filter portion of the first hue, and a first unopened sub-pixel, which has the second color filter portion of the second hue.

According to the aforementioned configuration, the third pixel includes the first opened sub-pixel with the first opened filter portion, which has the first color filter portion of the first hue formed with the first opening, in addition to the first unopened sub-pixel with the second color filter portion of the second hue and the third unopened sub-pixel with the third color filter portion of the third hue. The fourth pixel includes the second opened sub-pixel with the second opened filter portion, which has the second color filter portion of the second hue formed with the second opening, in addition to the second unopened sub-pixel with the first color filter portion of the first hue and the third unopened sub-pixel with the third color filter portion of the third hue. The fifth pixel includes the third opened sub-pixel, which has the third color filter portion of the third hue formed with the third opening, in addition to the second unopened sub-pixel with the first color filter portion of the first hue and the first unopened sub-pixel with the second color filter portion of the second hue. Therefore, the liquid crystal display device may display a very bright video without a complicated design of pixels.

The liquid crystal display device may further include an input portion to which a video signal is input to display the video. Each size of the first to third openings may be designed so that the third to fifth pixels emit light at equal luminance if the video signal defines equal luminance for the third to fifth pixels.

According to the aforementioned configuration, each size of the first to third openings is designed so that the third to fifth pixels emit light at equal luminance if the video signal input to the input portion defines equal luminance for the third to fifth pixels. Therefore, the liquid crystal display device may display a video with uniform luminance.

The first to third hues may be selected from a group consisting of red, green and blue respectively. The video signal may define emission colors and luminance of the third to fifth pixels by means of the red, green and blue hues.

According to the aforementioned configuration, the liquid crystal display device may display a very bright color video without downsizing sub-pixels and increasing source driver pins, source lines and TFTs.

The liquid crystal display device may further include an averaging portion which averages the emission colors assigned by the video signal in a pixel region including the third to fifth pixels to output an averaged color signal; and a luminance determining portion configured to determine luminance of light emitted from the first to third unopened sub-pixels and the first to third opened sub-pixels for the third to fifth pixels in response to the averaged color signal.

According to the aforementioned configuration, the averaging portion averages the emission colors assigned by the video signal in a pixel region including the third to fifth pixels to output the averaged color signal. The luminance determining portion determines luminance of light emitted from the first to third unopened sub-pixels and the first to third opened sub-pixels for the third to fifth pixels. Therefore, the liquid crystal display device may display a video appropriately in response to the video signal.

The liquid crystal display device may further include an emission selector configured to selectively determine whether or not the first to third opened sub-pixels emit light. The luminance determining portion may determine the luminance of the light emitted from the first to third unopened sub-pixels and the first to third opened sub-pixels for the third to fifth pixels in response to the averaged color signal and a determination made by the emission selector.

According to the aforementioned configuration, the liquid crystal display device allows selection whether or not to emit light from the first to third opened sub-pixels. Unless light is emitted from the first to third opened sub-pixels in response to the determination by the emission selector, a displayed video on the display surface may have high color reproducibility with low luminance. If light is emitted from the first to third opened sub-pixels in response to the determination by the emission selector, a displayed video on the display surface may have high luminance with low color reproducibility.

The liquid crystal display device may be configured to be a transmissive liquid crystal display device.

According to the aforementioned configuration, the liquid crystal display device may be a transmissive liquid crystal display device. Therefore, the liquid crystal display device may display a very bright video by means of the openings formed in the color filter portions.

INDUSTRIAL APPLICABILITY

The principles of the present embodiments are advantageously applicable to display devices with liquid crystal panels.

This application is based on Japanese Patent application No. 2011-289605 filed in Japan Patent Office on Dec. 28, 2011, the contents of which are hereby incorporated by reference.

Although the present application has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A liquid crystal display device comprising:
    a display panel including a display surface configured to display a video in response to a video signal; and
    a back light device configured to emit light toward the display surface, wherein:
    the display surface includes pixel sets defined so that each of the pixel sets includes a plurality of pixels arranged in a matrix adjacent to each other in at least one of a vertical direction and a horizontal direction,
    the plurality of pixels includes a first pixel, a second pixel and a third pixel,
    each of the first pixel, the second pixel and the third pixel includes a first color filter portion, a second color filter portion, and a third color filter portion,
    the first color filter portion is configured to change light emitted from the backlight device into a first hue,
    the second color filter portion is configured to change light emitted from the backlight device into a second hue different from the first hue,
    the third color filter portion is configured to change light emitted from the backlight device into a third hue different from the first and second hues,
    the pixel sets include a single opening formed in the first color portion, a single opening formed in the second color portion and a single opening in the third color portion,
    the first pixel includes a first opened sub-pixel including the first color filter portion formed with a first opening, a first unopened sub-pixel including the second color filter portion and a second unopened sub-pixel including the third color filter portion,
    the second pixel includes a second opened sub-pixel including the second color filter portion formed with a second opening, a third unopened sub-pixel including the first color filter portion and a fourth unopened sub-pixel including the third color filter portion, and
    the third pixel includes a third opened sub-pixel including the third color filter portion formed with a third opening, a fifth unopened sub-pixel including the first color filter portion and a sixth unopened sub-pixel including the second color filter portion.

2. The liquid crystal display device according to claim 1, further comprising an input portion to which the video signal is input to display the video, wherein
    each size of the first to third openings is designed so that the first to third pixels emit light at equal luminance when the video signal defines equal luminance for the first to third pixels.

3. The liquid crystal display device according to claim 1, wherein the first to third hues are selected from a group consisting of red, green and blue, respectively; and
    the video signal defines emission colors and luminance from the first to third pixels by means of the red, green and blue hues.

4. The liquid crystal display device according to claim 1, further comprising:
- an averaging portion which averages the emission colors assigned by the video signal in a pixel region including the first to third pixels to output an averaged color signal; and
- a luminance determining portion configured to determine luminance of light emitted from the first to sixth unopened sub-pixels and the first to third opened sub-pixels for the first to third pixels in response to the averaged color signal.

5. The liquid crystal display device according to claim 1, configured to be a transmissive liquid crystal display device.

* * * * *